(12) United States Patent
Luo et al.

(10) Patent No.: US 8,743,973 B2
(45) Date of Patent: Jun. 3, 2014

(54) RECEIVER RESISTOR NETWORK FOR COMMON-MODE SIGNALING

(75) Inventors: Lei Luo, Durham, NC (US); Brian S. Leibowitz, San Francisco, CA (US); Jared L. Zerbe, Woodside, CA (US); Barry W. Daly, Chapel Hill, NC (US); Wayne D. Dettloff, Cary, NC (US); John C. Eble, III, Chapel Hill, NC (US); John Wilson, Raleigh, NC (US)

(73) Assignee: Rambus Inc., Sunnyvale, CA (US)

( * ) Notice: Subject to any disclaimer, the term of this patent is extended or adjusted under 35 U.S.C. 154(b) by 400 days.

(21) Appl. No.: 13/115,838

(22) Filed: May 25, 2011

(65) Prior Publication Data

US 2011/0293041 A1 Dec. 1, 2011

Related U.S. Application Data

(60) Provisional application No. 61/348,120, filed on May 25, 2010.

(51) Int. Cl.
*H04B 3/00* (2006.01)
*H04L 25/00* (2006.01)

(52) U.S. Cl.
USPC .......................................... 375/257; 375/316

(58) Field of Classification Search
CPC .............. H04L 25/026; H04L 25/0272; H04L 25/0276; H04L 25/0278; H04L 25/0292; H04L 25/0298; H04L 25/085; H03H 7/38

USPC .................. 375/257, 259, 316; 327/65, 563; 330/252, 253

See application file for complete search history.

(56) References Cited

U.S. PATENT DOCUMENTS

| | | | | |
|---|---|---|---|---|
| 7,042,254 | B2* | 5/2006 | Hori | 327/65 |
| 7,145,413 | B2* | 12/2006 | Hsu et al. | 333/33 |
| 7,233,203 | B2* | 6/2007 | Huang | 330/259 |
| 7,902,627 | B2* | 3/2011 | Dong et al. | 257/499 |
| 2003/0070026 | A1* | 4/2003 | Sides et al. | 710/305 |
| 2009/0052559 | A1* | 2/2009 | Iwasaki | 375/257 |

* cited by examiner

*Primary Examiner* — David B. Lugo
(74) *Attorney, Agent, or Firm* — Morgan, Lewis & Bockius LLP

(57) ABSTRACT

A receiver circuit to receive signals from first and second pairs of transmission lines includes first and second interfaces, each with first and second input nodes to receive respective signals. The receiver circuit also includes a resistor network with first, second, third, and fourth resistive elements. The first and second resistive elements are each connected between the input nodes of a respective interface. The third and fourth resistive elements each include a pair of resistors connected in series between the input nodes of a respective interface, and an intermediate node between the resistors. The intermediate nodes are connected to an AC ground. The receiver circuit further includes a differential amplifier with first and second inputs coupled respectively to the first and second interfaces and an output to provide a signal derived from common mode components of the signals received at the input nodes.

27 Claims, 18 Drawing Sheets

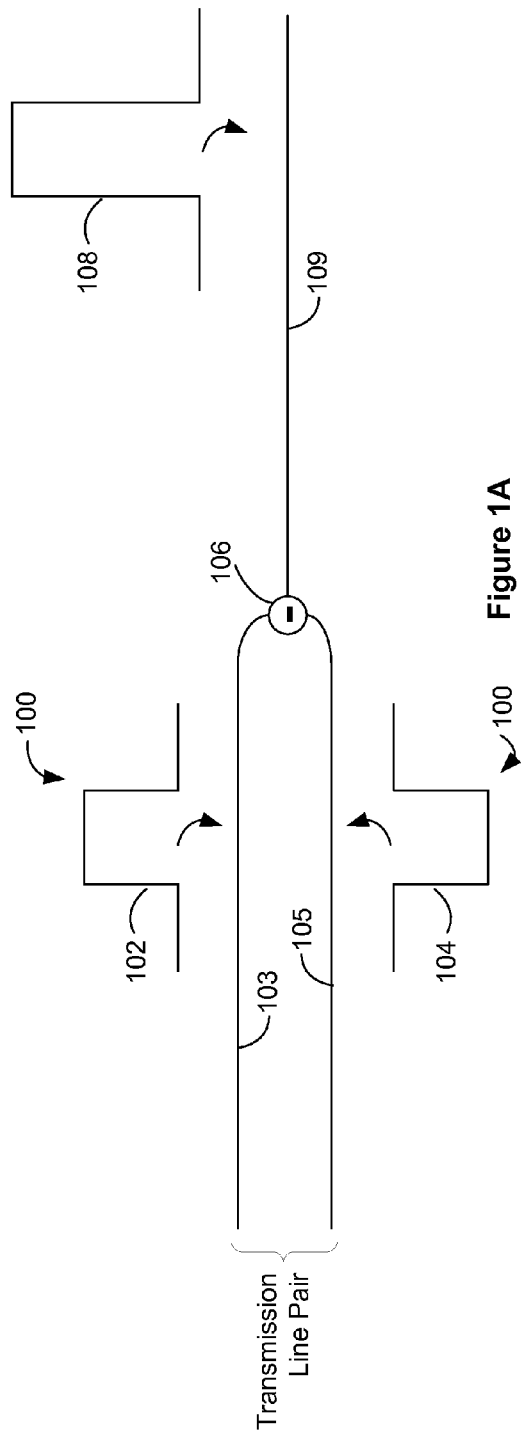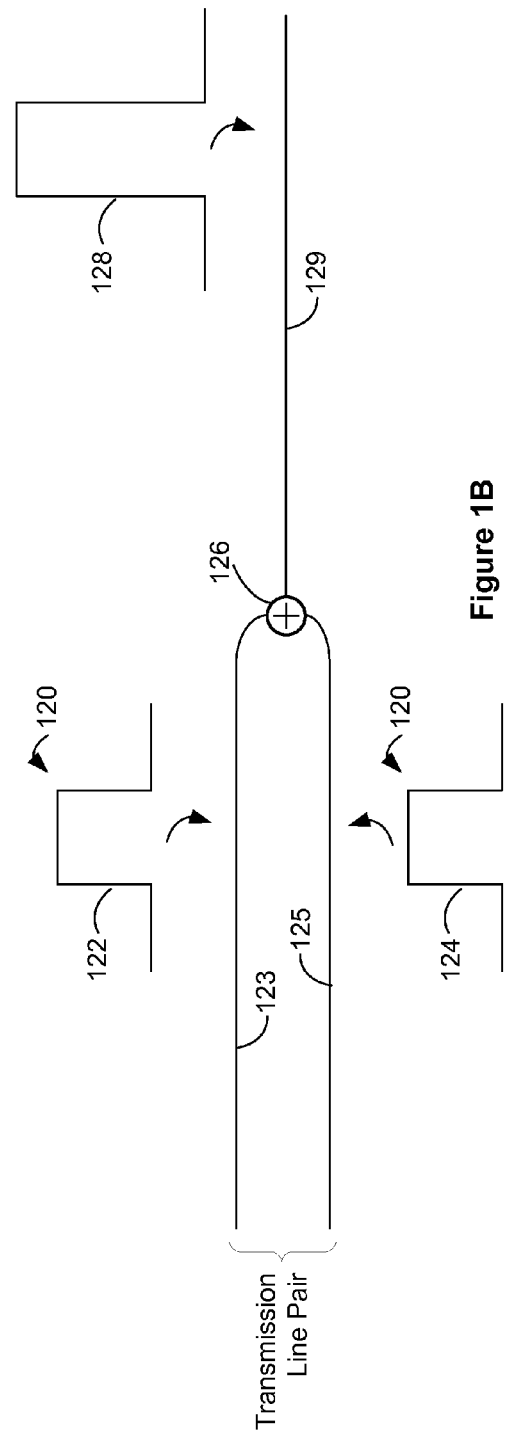

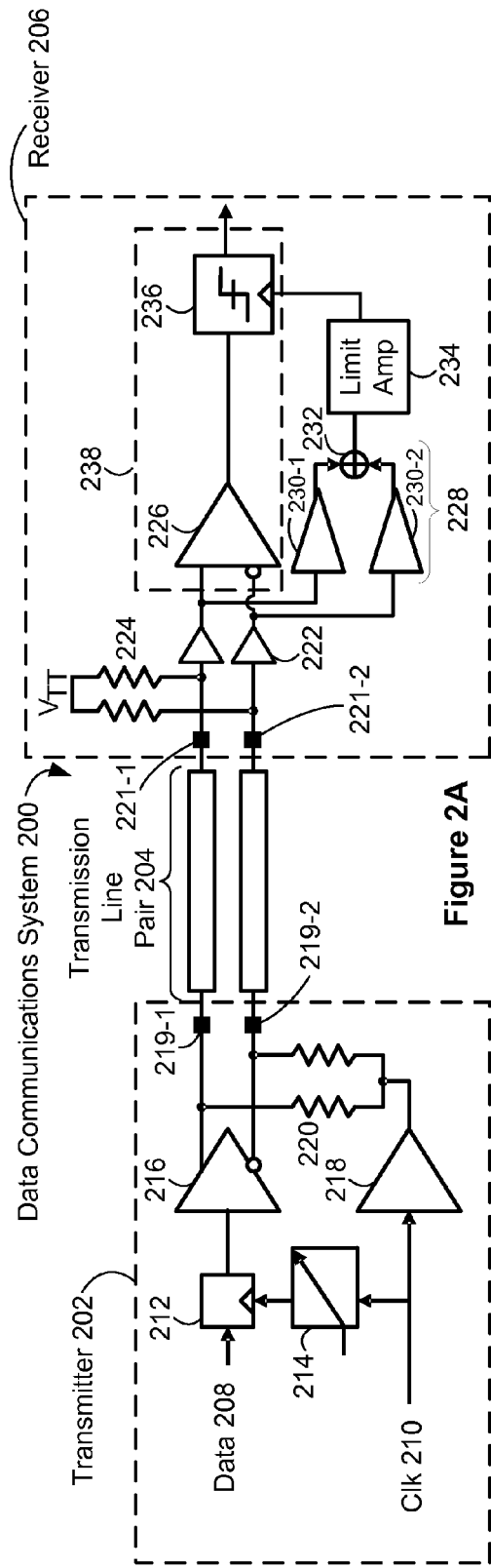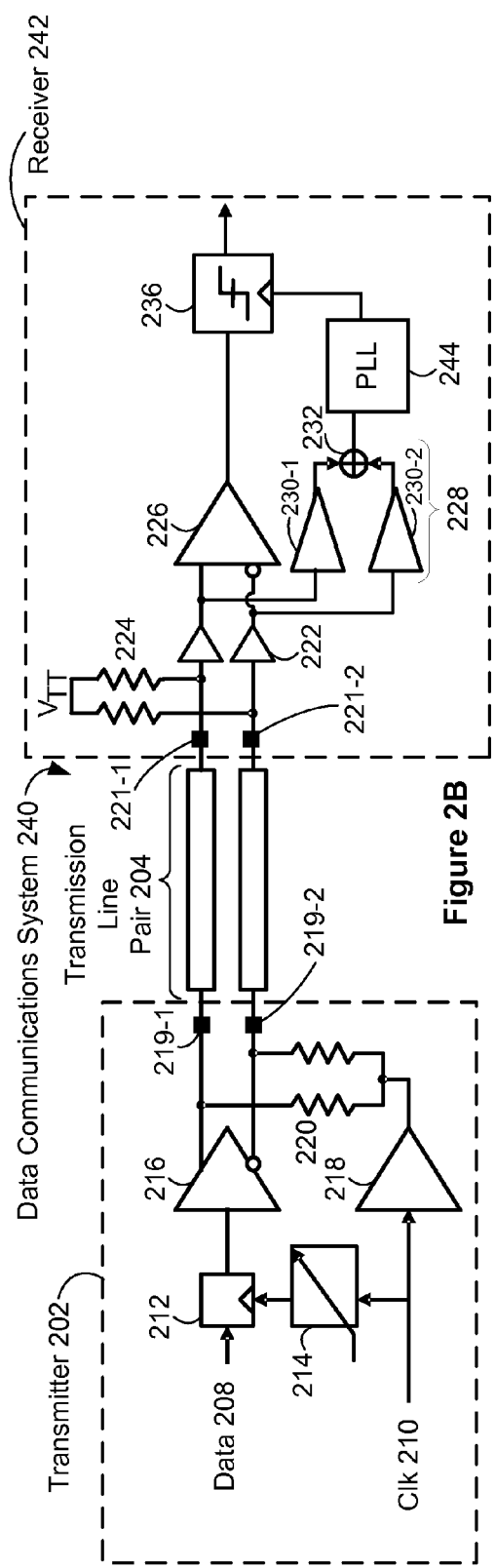

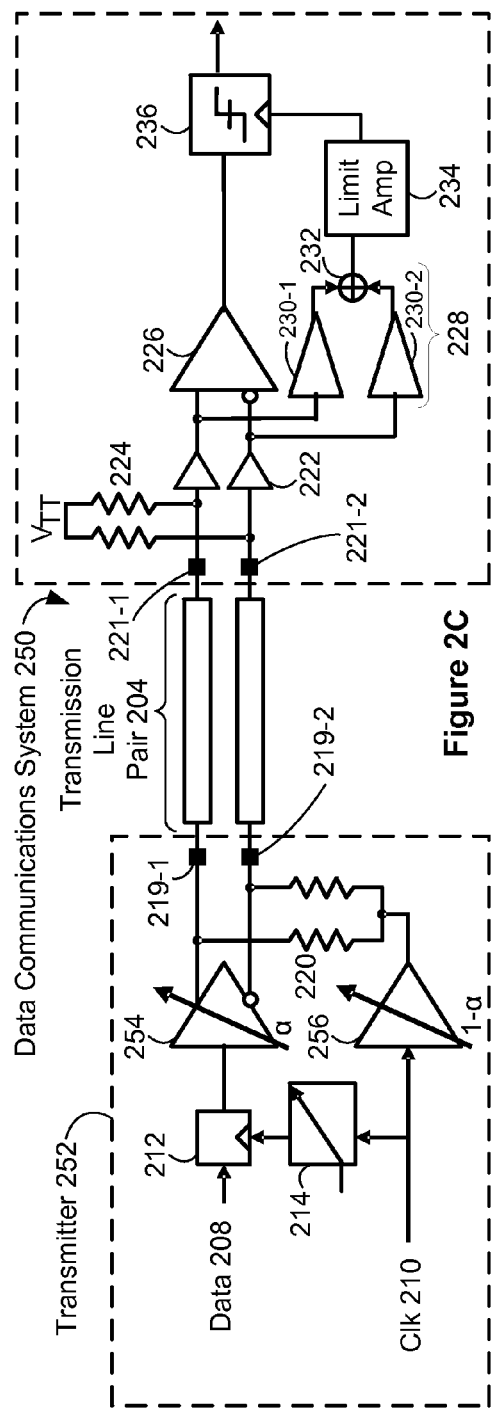
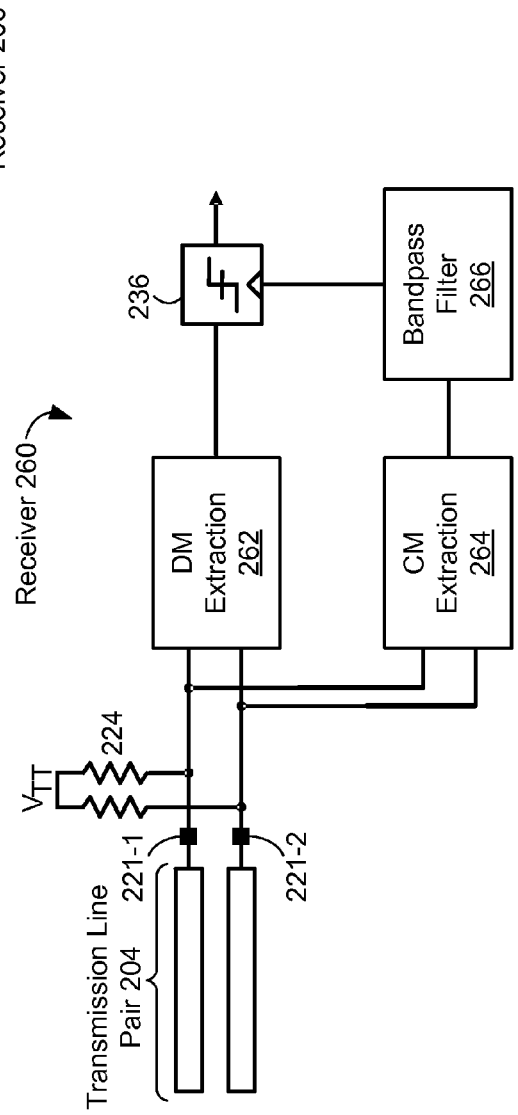
Figure 2C
Figure 2D

RECEIVER RESISTOR NETWORK FOR COMMON-MODE SIGNALING

RELATED APPLICATIONS

This application claims priority on U.S. Provisional Application Ser. No. 61/348,120, filed May 25, 2010, entitled "Receiver Resistor Network for Common-Mode Signaling," which is incorporated herein by reference in its entirety.

BACKGROUND

Source-synchronous common mode clocking systems, in which data is transmitted in differential mode while a clock signal is transmitted in common mode, present significant engineering challenges. For example, both the differential and common modes should be appropriately terminated to reduce or minimize reflections. Extracting the common-mode clock signal also presents challenges.

BRIEF DESCRIPTION OF THE DRAWINGS

FIG. 1A is a schematic illustration of differential-mode signaling.

FIG. 1B is a schematic illustration of common-mode signaling.

FIGS. 1C and 1D illustrate waveforms associated with simultaneously transmitting differential-mode 'Data' and common-mode 'Clock' signals over a pair of transmission lines.

FIGS. 2A-2C and 2F are block diagrams of a data communications system.

FIGS. 2D and 2E are block diagrams of a receiver.

Like reference numerals refer to corresponding parts throughout the drawings.

DESCRIPTION OF EMBODIMENTS

Figure 1D:
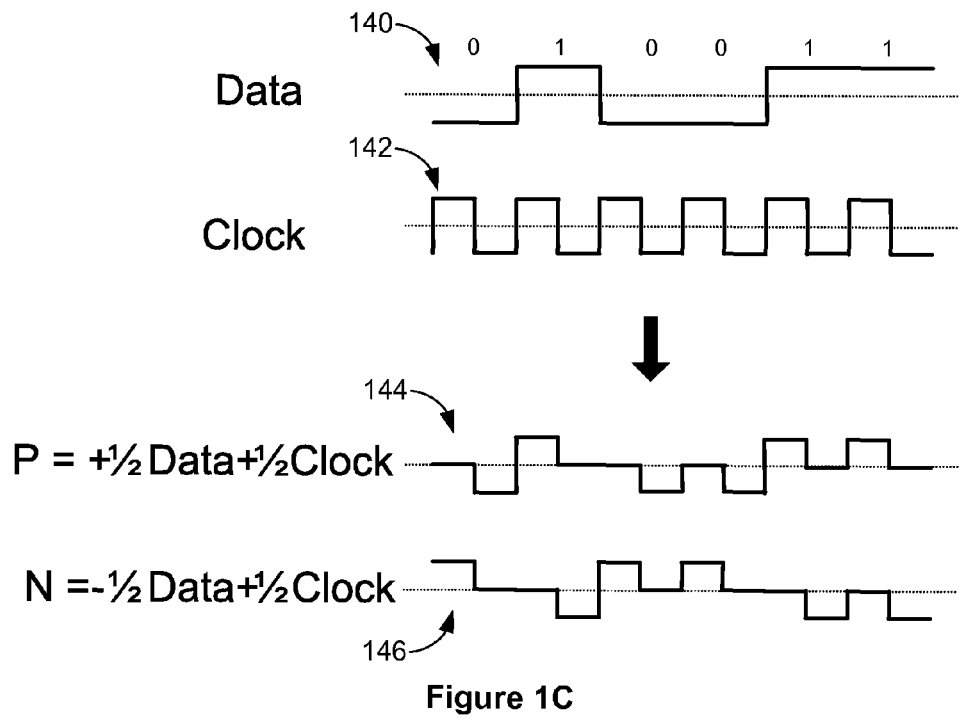
Figure 1D:
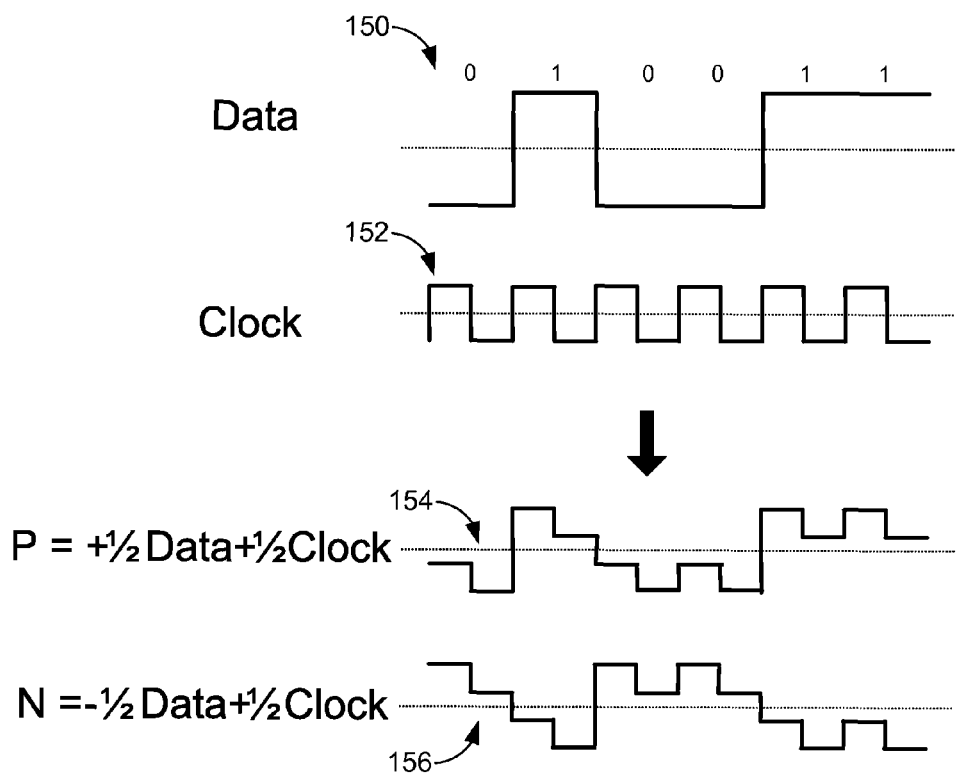

In some embodiments, a receiver circuit is to receive signals from first and second pairs of transmission lines at first and second interfaces. The receiver circuit includes a resistor network with first, second, third, and fourth resistive elements. The first and second resistive elements are each connected between first and second input nodes of a respective interface. The third and fourth resistive elements each include a pair of resistors connected in series between the first and second input nodes of a respective interface. Intermediate nodes between the resistors of the third and fourth resistive elements are connected to an AC ground. A differential amplifier with inputs coupled to the first and second interfaces provides an output signal derived from common mode components of the signals received at the input nodes.

In some embodiments, a method of receiving signals includes receiving respective pairs of transmission signals from respective first and second pairs of transmission lines at respective first and second interfaces. For each of the first and second interfaces, a first transmission signal is received at a first input node and a second transmission signal is received at a second input node. The pairs of transmission signals are supplied to a resistor network that includes first and second resistive elements, each connected between the first input node and second input node of a respective interface. The resistor network also includes third and fourth resistive elements, each including a pair of resistors connected in series between the first input node and second input node of a respective interface. Intermediate nodes between the resistors in the third and fourth resistive elements are connected to an AC ground. Common-mode signal components are extracted from the pairs of transmission signals and an output signal derived from the extracted common-mode signal components is generated.

Reference will now be made in detail to various embodiments, examples of which are illustrated in the accompanying drawings. In the following detailed description, numerous specific details are set forth in order to provide a thorough understanding of the present inventions. However, the present inventions may be practiced without these specific details. In other instances, well-known methods, procedures, components, and circuits have not been described in detail so as not to unnecessarily obscure aspects of the embodiments.

Multiple signals, such as a data signal and a clock signal, may be transmitted simultaneously over a channel, such as a transmission line or a pair of transmission lines. In some embodiments, a first signal is transmitted differentially over a pair of transmission lines and a second signal is simultaneously transmitted over the pair of transmission lines in a common mode. For example, a clock signal is transmitted in a common mode and a data signal is simultaneously transmitted differentially, where the data signal has a symbol rate corresponding to the frequency of the clock signal. Examples of correspondence between the symbol rate and the clock frequency include single-data-rate signaling (SDR), in which the symbol rate equals the clock frequency, and double-data-rate (DDR) signaling, in which the symbol rate is twice the clock frequency but the data has a Nyquist frequency equal to that of the clock; other ratios are possible. Differential and common-mode signaling are discussed further with regard to FIGS. 1A and 1B, below. In some embodiments, the clock signal is transmitted when data is transmitted and is otherwise deactivated. In some embodiments, the clock signal is replaced by a strobe signal.

In differential signaling, a first transmission line in a pair of transmission lines carries a signal and a second transmission line in the pair carries the inverse of the signal. The inverse of the signal has an equal magnitude and an opposite polarity to the signal. The sum of the voltages on the two transmission lines corresponding to the two signals is constant. A signal transmitted using differential signaling is herein referred to as a differential-mode signal.

FIG. 1A is a schematic illustration of differential-mode signaling. A differential-mode signal 100 includes a first signal 102 transmitted on a first transmission line 103 and a second signal 104 transmitted on a second transmission line 105. The second signal 104 has an equal magnitude (or a substantially equal magnitude if the circuits producing the two signals are not perfectly matched) and an opposite polarity to the first signal 102. At the end of the transmission lines 103 and 105, a combiner 106 extracts the transmitted signal by taking the difference of the first signal 102 and the second signal 104, producing an extracted signal 108 on a signal line 109.

A pair of transmission lines that transmits a differential mode signal may additionally transmit a common-mode signal superimposed on the differential mode signal. In common-mode signaling, the same signal is transmitted on both transmission lines in the pair.

FIG. 1B is a schematic illustration of common-mode signaling. A common-mode signal 120 includes a first signal 122 transmitted on a first transmission line 123 and a second signal 124 transmitted on a second transmission line 125. The first signal 122 and the second signal 124 have equal magnitudes (or substantially equal magnitudes if the circuits producing the two signals are not perfectly matched) and equal polarities (i.e., the same polarity, or substantially the same polarity if the circuits producing the two signals are not perfectly matched). At the end of the transmission lines 123 and 125, a combiner 126 extracts the transmitted signal by summing the first signal 122 and the second signal 124, producing an extracted signal 128 on a signal line 129.

Differential-mode and common-mode signals transmitted simultaneously over a pair of transmission lines can be independently extracted by a receiver. Taking the difference of the voltages on the two transmission lines (e.g., with a combiner 106) will cancel out a common-mode signal and extract a differential-mode signal. Summing the voltages on the two transmission lines (e.g., with a combiner 126) will cancel out a differential-mode signal and extract a common-mode signal.

A pair of transmission lines that transmit differential-mode and/or common-mode signals can be implemented as two or more traces on one or more printed circuit boards (e.g., a backplane link), two or more signal paths on a semiconductor device, or a channel in a network (e.g., an Ethernet network).

FIGS. 1C and 1D illustrate waveforms associated with simultaneously transmitting differential-mode and common-mode signals over a pair of transmission lines. In these examples, a data signal is transmitted differentially and a clock signal is transmitted in common mode; some implementations may choose other signaling modes for clock and data separation, such as sending data in common mode and clock in differential mode. In FIG. 1C, a data waveform 140 corresponding to a particular polarity of a differential-mode data signal and a clock waveform 142 corresponding to a common-mode clock signal are transmitted with equal amplitudes. The differential-mode data signal and common-mode clock signal are simultaneously driven onto the pair of transmission lines, resulting in a waveform 144 on the first transmission line of the pair and a waveform 146 on the second transmission line of the pair. A receiver can recover the clock and data waveforms 140 and 142, as described below.

In FIG. 1D, the differential-mode data signal 150 and common-mode clock signal 152 are simultaneously driven onto the pair of transmission lines with the data signal 150 having an amplitude twice that of the clock signal 152. This results in a waveform 154 on the first transmission line of the pair and a waveform 156 on the second transmission line of the pair. (Waveforms 154 and 156 are not drawn to scale with respect to waveforms 150 and 152). In FIGS. 1C and 1D data transitions are phase-aligned to rising clock edges. Generally, however, data transitions and rising clock edges may be preskewed by an amount that is convenient for the receive device. FIGS. 1C and 1D are examples of different amplitude ratios between transmitted differential and common-mode signals. It follows from examples 1C and 1D that the ratio of the differential and common-mode signal may be selected to have some fractional amplitude relationship with the possibility of either signal being the larger, as conditions dictate.

Figure 2E:
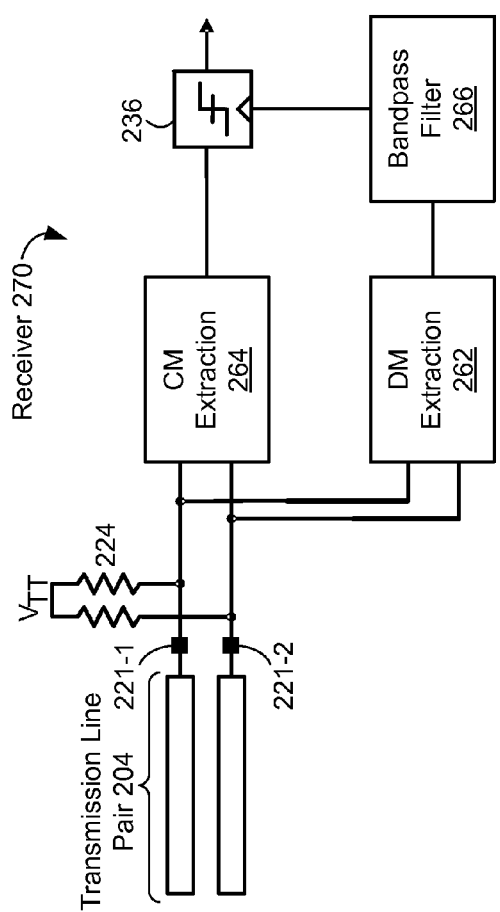

FIG. 2A is a block diagram of a data communications system 200. The data communications system 200 includes a transmitter 202, a pair of transmission lines 204, and a receiver 206.

The transmitter 202 obtains for transmission a data signal 208 and a clock signal 210. For example, the transmitter 202 may receive a data stream comprising the data signal 208 from another device or circuit, or may receive data retrieved from one or more memory devices or memory arrays as the data signal 208. A clock driver 218 drives the clock signal 210 via output nodes 219-1 and 219-2 onto the pair of transmission lines 204 in common mode. Simultaneously, a data driver 216 drives the data signal 208 via the output nodes 219-1 and 219-2 onto the pair of transmission lines 204 in a differential mode with a symbol rate corresponding to the clock signal frequency. In some implementations, the clock driver 218 and/or the data driver 216 are line drivers, such as digital-to-analog converters (DACs) (e.g., zero-order hold DACs). In some implementations, the path between the clock driver 218 and the pair of transmission lines 204 includes termination resistors 220. In some implementations, the output nodes 219-1 and 219-2 include pins, balls, or other electrical contacts of a semiconductor package.

In some implementations, a phase adjuster 214 receives the clock signal 210 and provides a phase-adjusted clock signal to a data retimer 212. The data retimer 212 receives the data signal 208 and provides the data signal to the data driver 216 at a symbol rate corresponding to the clock signal frequency. In some implementations, the phase adjuster 214 is a phase interpolator. In some implementations, the phase adjuster 214 is a phase-locked loop (PLL), a delay-locked loop (DLL), a voltage controlled delay line (VCDL), or other timing adjustment circuit.

In some implementations, the data driver and clock driver have programmable drive strengths, as shown for data driver 254 and clock driver 256 of transmitter 252 in data communications system 250 (FIG. 2C). In some implementations, the drive strengths (and corresponding output swings) of the data driver 254 and the clock driver 256 are adjustable and may sum to a fixed total drive strength: if the data driver 254 has a drive strength of a, the clock driver 256 has a normalized drive strength of 1-α, assuming a normalized total drive strength of 1. The combined output swing of the data driver 254 and clock driver 256 thus remains substantially constant and the respective drive strengths of the data driver 254 and the clock driver 256 can be traded off against each other. In some embodiments, the output swings of the data driver 254 and clock driver 256 may be simultaneously increased or reduced to optimize the reception of the final data signal, as long as the combined output swing of the drivers remains less than or equal to the fixed total drive strength. Increasing the drive strength of the clock driver 256 improves reception of the clock signal by the receiver 206, reducing jitter for reception of the data signal. Increasing the drive strength of the data driver 254 improves reception of the data signal by the receiver 206 by improving voltage swing.

The receiver 206 receives, via an interface with the transmission line pair 204 that includes first and second input nodes 221-1 and 221-2, a transmission signal that includes the differential-mode data signal and the common-mode clock signal. In some embodiments, the input nodes 221-1 and 221-2 include pins, balls, or other electrical contacts of a semiconductor package. A differential mode extraction circuit 226 extracts the differential-mode data signal from the received transmission signal. The extracted data signal is provided to a sampling circuit 236 that samples the extracted data signal. The combination of the differential mode extraction circuit 226 and the sampling circuit 236 is an example of a differential mode circuit 238 for a receiver.

A common mode extraction circuit 228 extracts the common-mode clock signal from the received transmission signal. In some implementations, the common mode extraction circuit 228 includes buffers 230 and a combiner 232. The extracted clock signal is provided to the sampling circuit 236 via an optional limiting amplifier 234 which can reduce the voltage and timing noise. In some implementations, the common mode extraction circuit 228 includes a band-pass filter, such as an LC network with a resonant peak substantially centered on the clock signal frequency. In some implementations the common mode extraction circuit includes a resistor divider.

In some implementations, the limit amplifier 234, also referred to as a clipping amplifier, amplifies the extracted clock signal and provides the amplified clock signal to the sampling circuit 236. In some implementations, a timing circuit receives the extracted clock signal and provides a clock signal to the sampling circuit 236. In some implementations, the timing circuit includes a PLL 244 (receiver 242; FIG. 2B) or a DLL (not shown). In some embodiments, the timing circuit includes a phase interpolator (not shown).

In some implementations, the receiver 206 includes buffers 222 to isolate the receiver circuitry from the pair of transmission lines 204. In some implementations, termination resistors 224 terminate the pair of transmission lines 204. Each of the termination resistors 224 may be coupled at one end to a termination voltage source $V_{TT}$, and at the other end to a respective transmission line of the pair 204.

While the receiver 206 is shown as having a single sampling circuit 236, in some implementations the receiver includes two or more sampling circuits to accommodate DDR signaling.

Figure 2F:
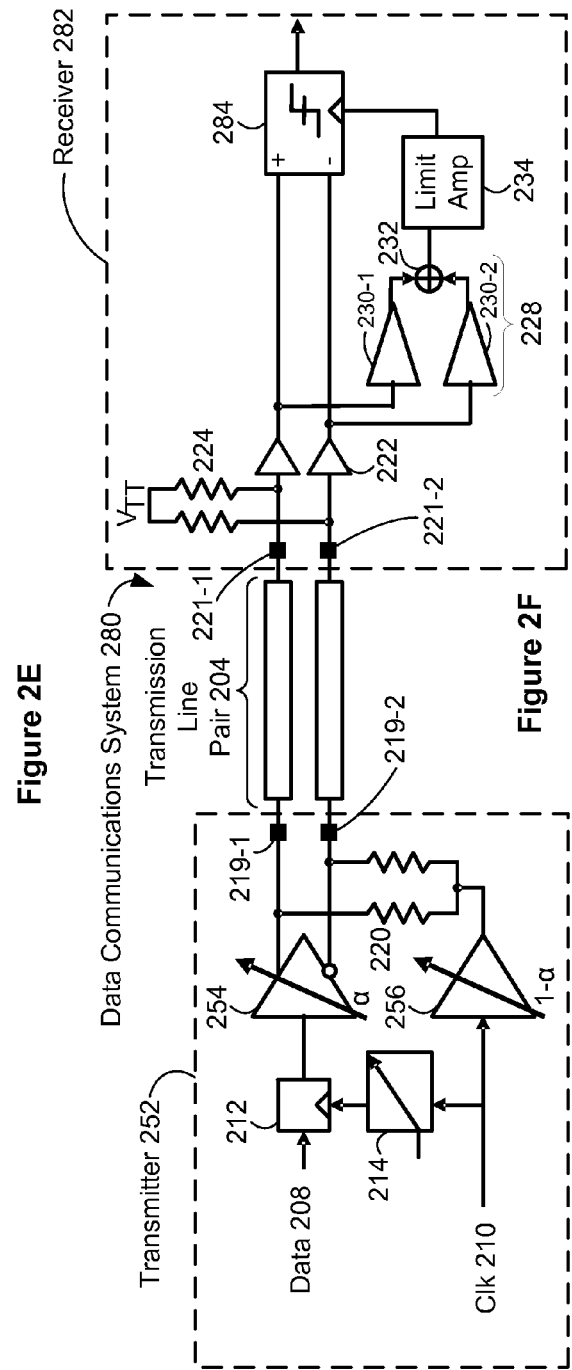

In some implementations, a differential sampling circuit 284 in a receiver 282 performs both the differential mode extraction and data sampling operations, as illustrated in FIG. 2F. The differential sampling circuit 284 replaces the differential mode extraction circuit 226 and the sampling circuit 236 of receiver 206 (FIG. 2A or 2C). Similarly, in some implementations, the differential sampling circuit 284 replaces the differential mode extraction circuit 226 and the sampling circuit 236 of receiver 242 (FIG. 2B). The differential sampling circuit 284 is an example of a differential mode circuit for a receiver.

FIG. 2D is a high-level block diagram of a receiver 260. The receiver 260, like the receivers 206 (FIG. 2A) and 242 (FIG. 2B), simultaneously receives a differential-mode (DM) signal and a common-mode (CM) signal via the transmission line pair 204. DM extraction circuit 262 extracts the differential-mode signal and provides the extracted DM signal to the sampling circuit 236. CM extraction circuit 264 extracts the common-mode signal and provides the extracted CM signal to an optional bandpass filter 266, which filters the extracted CM signal. The filtered signal is provided as a clock to the sampling circuit 236. In some embodiments, the optional bandpass filter 266 is replaced with a PLL, a DLL, a phase interpolator, or a limit amplifier. Alternatively, the extracted CM signal is directly provided as a clock to the sampling circuit 236.

FIGS. 2A-2D and 2F illustrate examples of data communications systems in which a data signal is transmitted in differential mode over a pair of transmission lines simultaneously with a clock signal transmitted in common mode over the pair of transmission lines. In some embodiments, however, a data communications system may transmit a data signal in common mode over a pair of transmission lines simultaneously with a clock signal transmitted in differential mode over the pair of transmission lines. A transmitter for such a system could be implemented by modifying a transmitter 202 (FIGS. 2A-2B) or 252 (FIG. 2C) such that the clock driver 218 (FIGS. 2A-2B) or 256 (FIG. 2C) is instead used to drive data and the data driver 216 (FIGS. 2A-2B) or 254 (FIG. 2C) is used to drive the clock. A block diagram of a receiver 270 for such a system is illustrated in FIG. 2E. The receiver 270, like the receiver 260 (FIG. 2D), simultaneously receives a differential-mode (DM) signal and a common-mode (CM) signal via the transmission line pair 204. In the receiver 270, however, the CM extraction circuit 264 extracts the CM signal and provides the extracted CM signal to the sampling circuit 236 as a data signal to be sampled. The DM extraction circuit 262 extracts the DM signal and provides the extracted DM signal to a bandpass filter 266, which filters the extracted DM signal. The filtered signal is provided as a clock to the sampling circuit 236.

In some implementations, a first pair of transmission lines transmits a first common-mode clock signal and a second pair of transmission lines transmits a second common-mode clock signal. The first and second common-mode clock signals have opposite polarities (or substantially opposite polarities if the circuits producing the two signals are not perfectly matched). Thus, taken together, the first and second common-mode clock signals provide a single differential clock signal.

Figure 3A:
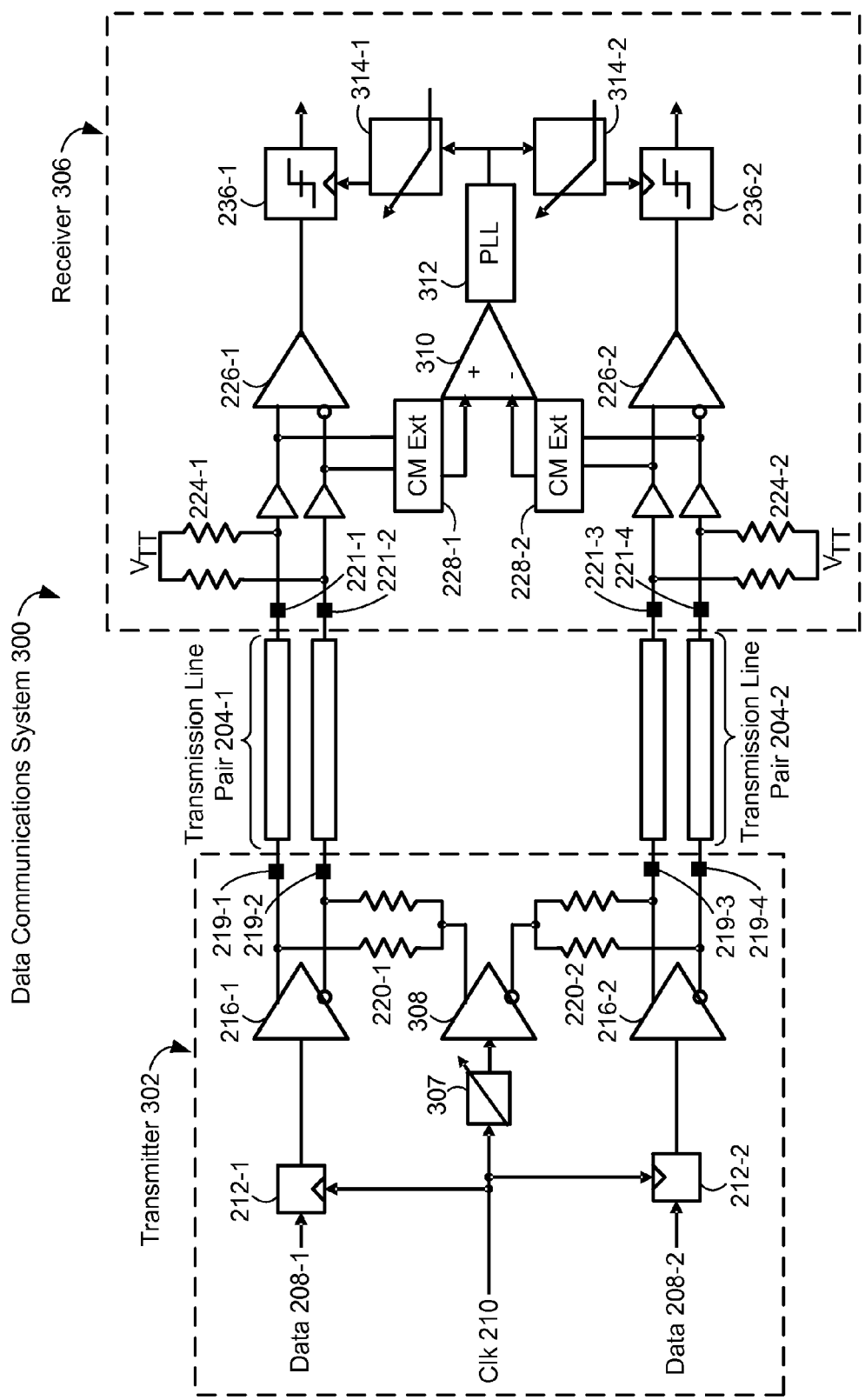
FIGS. 3A-3D are block diagrams of a data communications system.

FIG. 3A is a block diagram of another data communications system 300. The data communications system 300 includes a transmitter 302, two pairs of transmission lines 204, and a receiver 306. In some implementations, the transmitter 302 simultaneously transmits a first differential-mode data signal and a first common-mode output clock signal on the first transmission line pair 204-1 and a second differential-mode data signal and a second common-mode output clock signal on the second transmission line pair 204-2. In some implementations, the first and second common-mode clock signals have opposite polarities and thus effectively provide a single differential clock signal to the receiver 306. This reduces the electromagnetic interference (EMI) caused by the transmission of the clock signal and provides a larger, differential clock signal for the receiver 306.

The transmitter 302 receives for transmission data signals 208-1 and 208-2. The respective data signals 208 are provided to respective data retimers 212, which also obtain an input clock signal 210 and which provide the respective data signals 208 to respective data drivers 216 at a symbol rate corresponding to the input clock signal 210 frequency. The data drivers 216 drive the respective data signals 208 onto the respective transmission line pairs 204 at a symbol rate corresponding to the input clock signal 210 frequency.

The input clock signal 210 is provided to a clock driver 308, which drives the first common mode output clock signal onto the first pair 204-1 of transmission lines and the second common mode output clock signal onto the second pair 204-2 of transmission lines. In some implementations, a phase adjuster 307 (e.g., a phase offset vernier) adjusts the phase of the clock signal provided to the clock driver 308 to compensate for skew between the data drivers 216 and the clock driver 308. In some embodiments, the vernier phase offset is approximately 90 degrees.

Figure 3B:
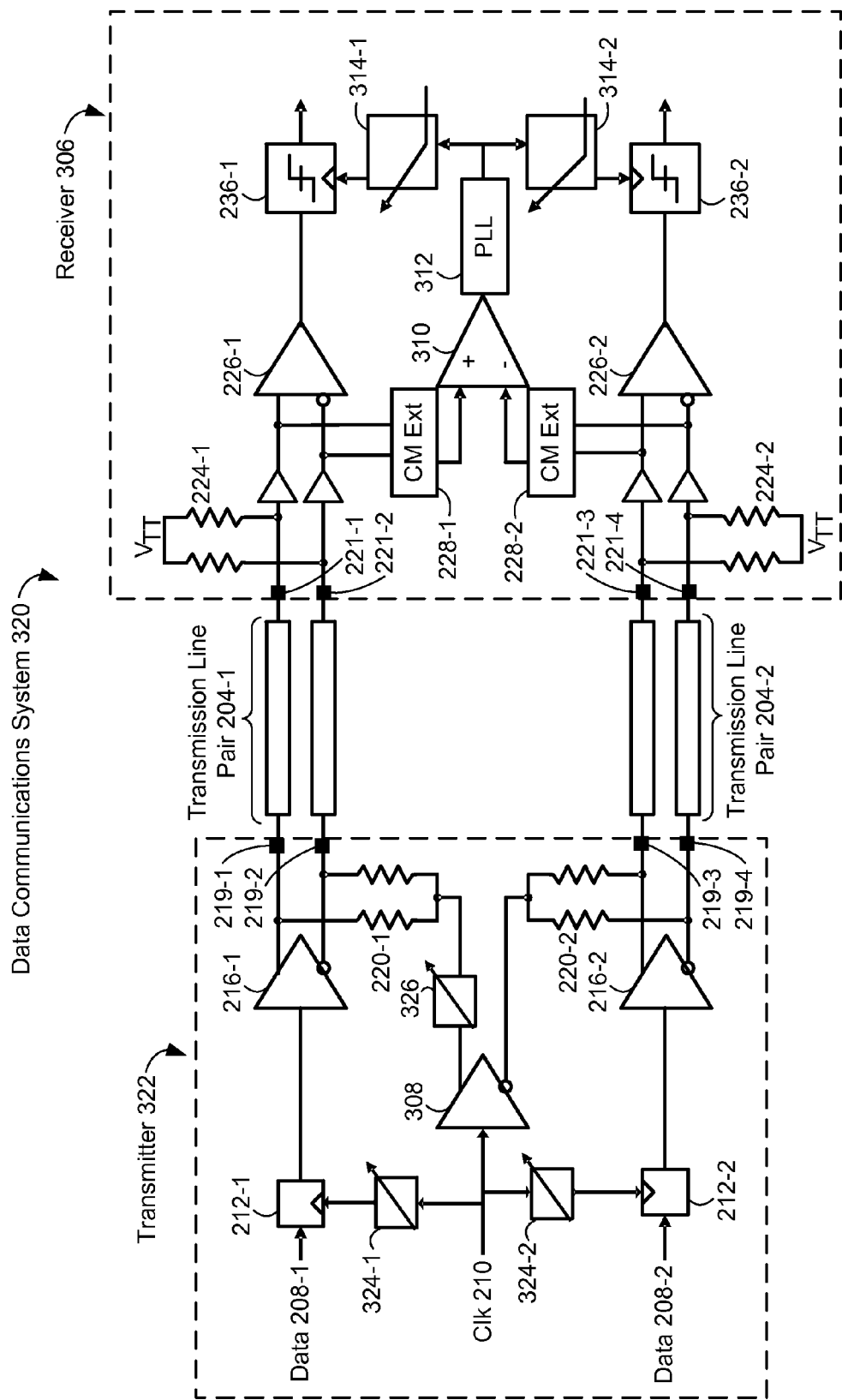
Figure 3C:
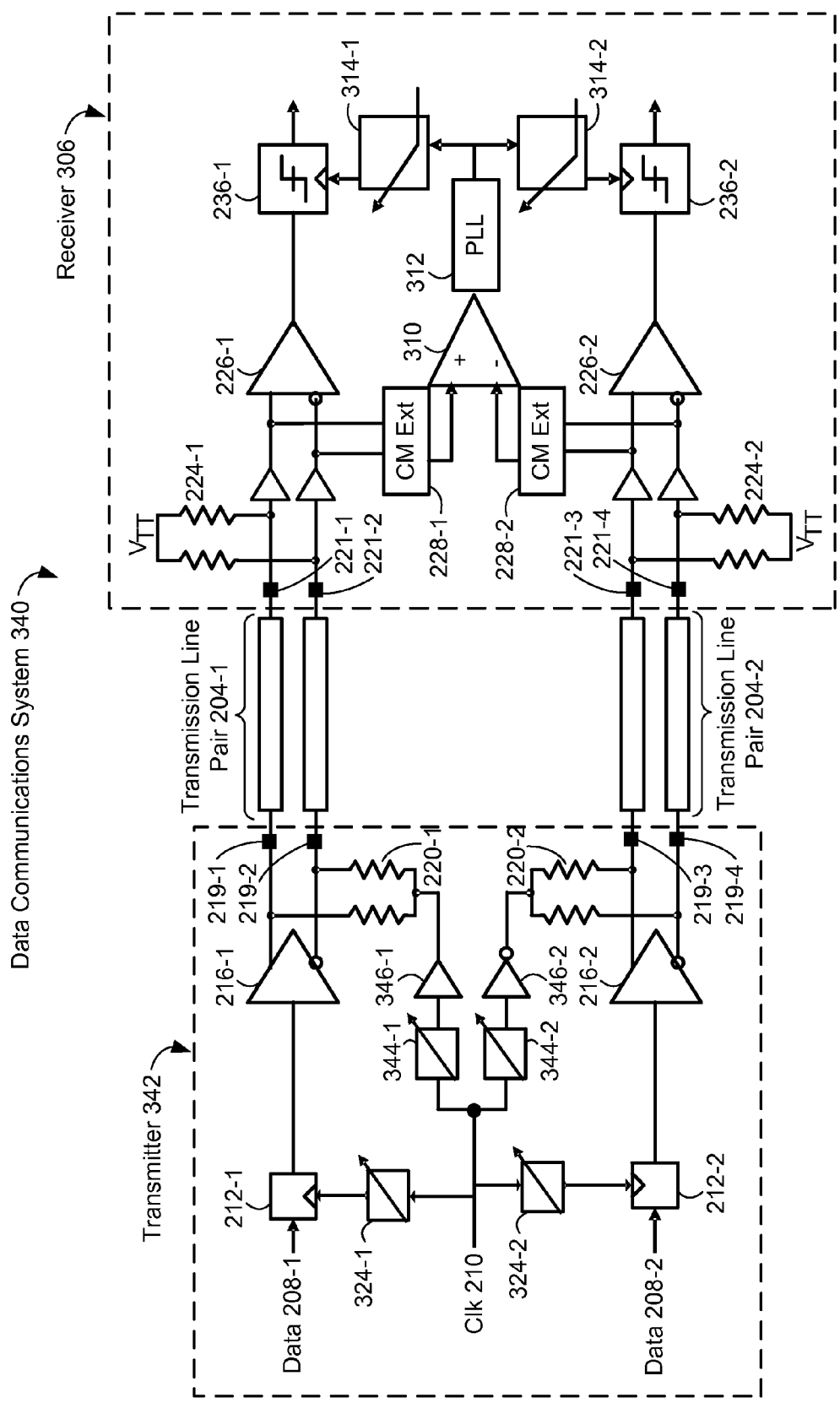

Other skew compensation schemes may be implemented in the transmitter, as illustrated in FIGS. 3B-3C. In the data communication system 320 (FIG. 3B), phase adjusters 324-1 and 324-2 independently adjust the phases of respective clock signals provided to the data retimers 212-1 and 212-2. These adjustments allow for compensation of skews in the delay paths of the transmission line paths 204-1 and 204-2 as well as differences in the propagation speed between the differential and common modes. Adjustments made 'in common' to phase adjusters 324-1 and 324-2 will affect a skew relative to the common-mode clock driven by driver 308, whereas adjustments made 'in difference' between phase adjusters 324-1 and 324-2 will compensate for differences in path lengths between transmission line pairs 204-1 and 204-2.

In addition, a phase adjuster 326 adjusts the phase of the clock signal driven by the clock driver 308 onto the first transmission line pair 204-1 and allows for compensation of any skews in the common-mode path between signal pair 204-1 and 204-2 so that by the time the clock signals are recombined in clock buffer 310 they have been deskewed.

Alternatively, as illustrated for the data communication system 340 (FIG. 3C), separate clock drivers 346-1 and 346-2 drive clock signals onto corresponding transmission line pairs 204-1 and 204-2. Phase adjusters 344-1 and 344-2 independently adjust the phases of respective clock signals provided to the clock drivers 346-1 and 346-2. The data communication system 340 also includes the phase adjusters 324-1 and 324-2 to adjust the phases of respective clock signals provided to the data retimers 212-1 and 212-2.

The receiver 306 receives respective transmission signals from the first and second transmission line pairs 204-1 and 204-2 that each includes a differential-mode data signal and a common-mode clock signal. The receiver 306 receives transmission signals from the first transmission line 204-1 via a first interface that includes first and second input nodes 221-1 and 221-2. Likewise, the receiver 306 receives transmission signals from the second transmission line 204-2 via a second interface that includes first and second input nodes 221-3 and 221-4. The first and second interfaces thus each include a first input node (e.g., 221-1 or 221-3) to receive a signal from a first transmission line of the pair 204-1 or 204-2 and a second input node (e.g., 221-2 or 221-4) to receive a signal from a second transmission line of the pair 204-1 or 204-2. Differential mode extraction circuits 226 extract the differential-mode data signals from the transmission signals. The extracted data signals are provided to sampling circuits 236 that sample the extracted data signals. In some embodiments, a differential sampling circuit (e.g., 284, FIG. 2F) replaces each differential mode extraction circuit 226 and corresponding sampling circuit 236.

A common-mode extraction circuit 228 extracts the respective common-mode output clock signal from the respective transmission signal. The first and second extracted output clock signals, with opposite polarity, are provided to a combiner 310 that combines the extracted output clock signals into a single sampling clock signal. The sampling circuits 236-1 and 236-2 are synchronized to the sampling clock signal.

In some implementations, the combiner 310 provides the sampling clock signal to a timing circuit. The timing circuit receives the sampling clock signal and provides a clock signal to the first sampling circuit 236-1 and the second sampling circuit 236-2. In some implementations, the timing circuit includes a PLL 312 or a DLL (not shown). In some implementations, the timing circuit includes a phase interpolator 314 coupled to the PLL 312 and to a sampling circuit 236 to adjust the phase of the clock signal provided to the sampling circuit. In the implementations shown in FIGS. 3A-3C, optional phase interpolators 314-1 and 314-2 couple the PLL 312 to sampling circuits 236-1 and 236-2, respectively, to adjust the phases of the clock signals provided to the sampling circuits 236. Optionally, the PLL 312 may also adjust the frequency of the sampling clock signal to match the symbol rate of the data signal.

In some implementations, the combiner 310 provides the sampling clock signal to a clipping amplifier (not shown). The clipping amplifier amplifies the sampling clock signal and provides the amplified sampling clock signal to the sampling circuits 236.

Figure 3D:
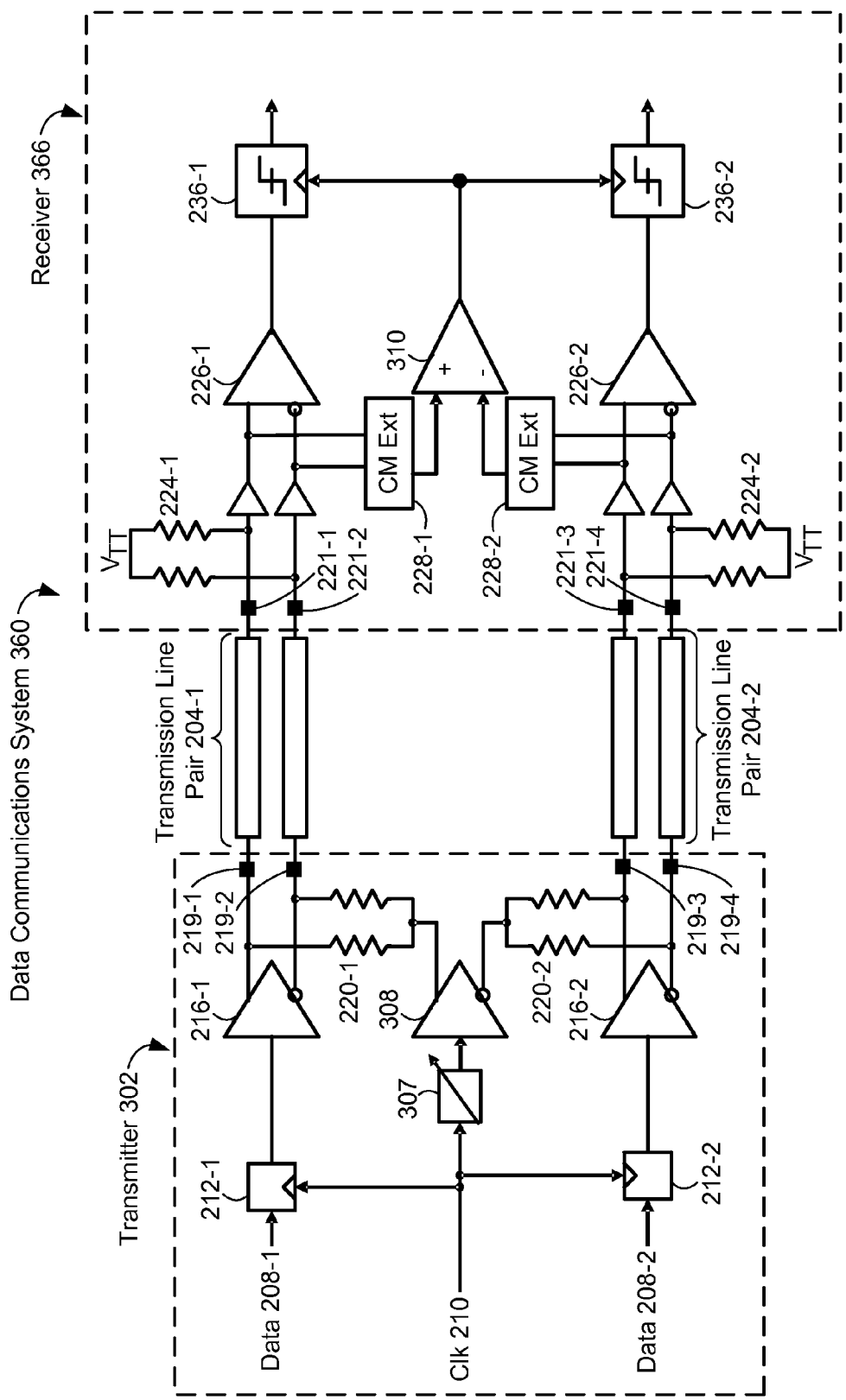

Alternatively, instead of providing the sampling clock signal to a timing circuit or to an amplifier, the combiner 310 provides the sampling clock signal directly to the sampling circuits 236-1 and 236-2, as illustrated for receiver 366 in FIG. 3D. Elimination of the clock retiming (PLL) circuits can be advantageous for high performance, low power applications in that it facilitates rapid turn on and turn off of clocks and data without having to wait for a PLL to relock or for clock recovery to reacquire. In the absence of receiver circuitry to adjust the sampling clock signal, clock adjustments are handled in the transmitter. For example, in the system 360 (FIG. 3D), the phase adjuster 307 adjusts the timing of clock signals transmitted by the clock driver 308 with respect to data signals transmitted by the data drivers 216. While the receiver 366 is illustrated as implemented in a system 360 with transmitter 302, the receiver 366 also may be implemented in a system with transmitter 322 (FIG. 3B), transmitter 342 (FIG. 3C), or another transmitter with a suitable scheme (e.g., phase adjusters 324-1 and 324-2, which independently adjust the phases of respective clock signals provided to the data retimers 212-1 and 212-2) for deskewing transmitted signals.

FIGS. 3A-3D describe embodiments in which two transmission line pairs 204-1 and 204-2 are used to transmit a clock signal. In some embodiments, however, a clock signal is transmitted using more than two transmission line pairs. For example, a clock signal may be transmitted over four pairs of transmission lines, wherein positive polarities of the clock signal are transmitted over two of the pairs and negative polarities are transmitted over the remaining two pairs. In some embodiments, a single clock driver is used to drive the clock signal onto the multiple pairs of transmission lines, thus reducing the complexity of the transmitter circuitry. In some embodiments, the multiple pairs of transmission lines constitute a bus.

In some embodiments, a data communications system such as those described with regard to FIGS. 2A-2C, 2F, or 3A-3D is implemented in a single integrated circuit to enable on-chip communications. In some embodiments, a data communications system such as those described with regard to FIGS. 2A-2C, 2F, or 3A-3D is implemented for chips in a stacked package configuration, thereby enabling communications between respective chips stacked in a package.

Figure 4:
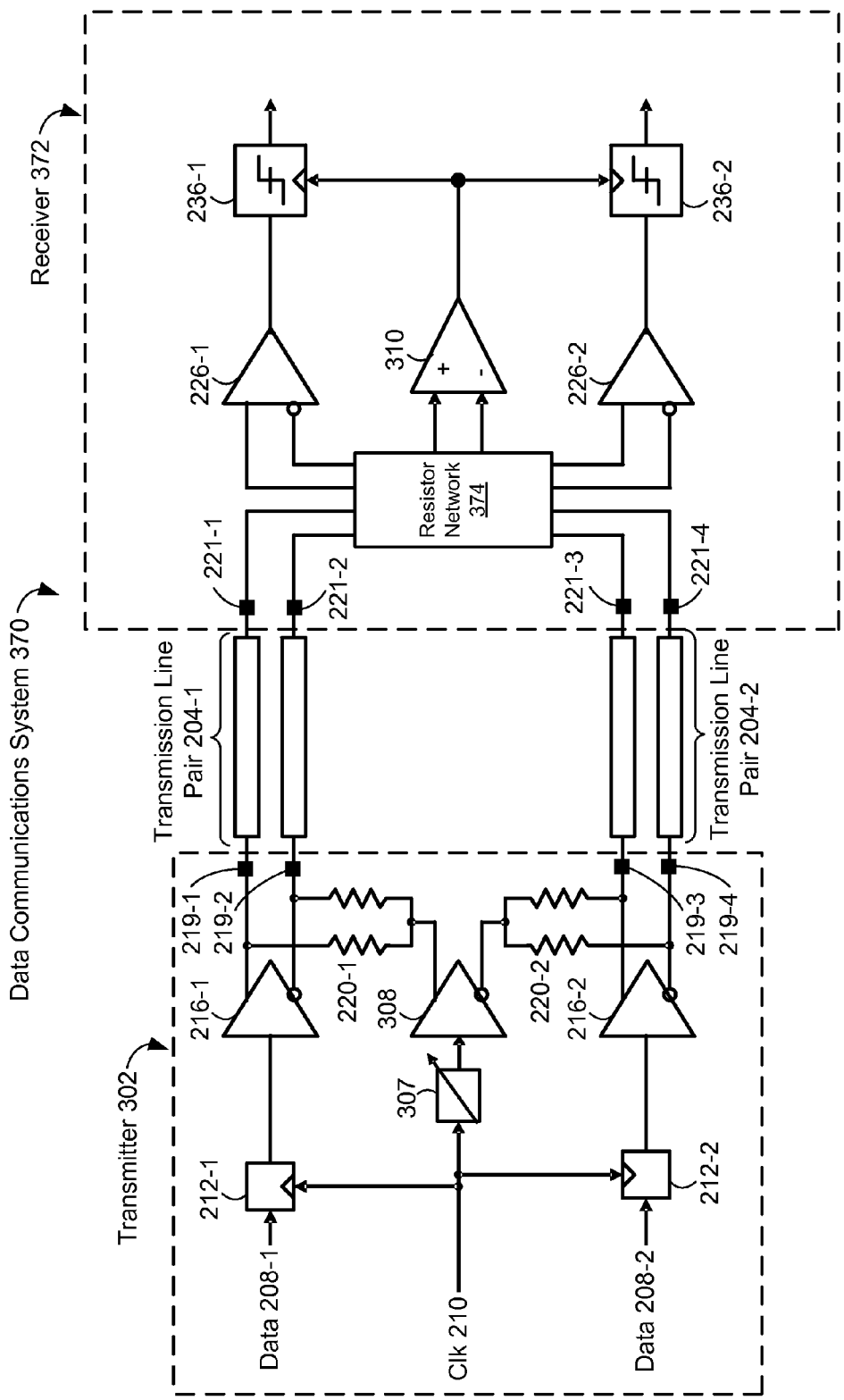
FIG. 4 is a block diagram of a data communications system in accordance with some embodiments.

FIG. 4 is a block diagram of a data communications system 370 in which the receiver 372 includes a resistor network 374 to terminate the transmission line pairs 204-1 and 204-2, in accordance with some embodiments. In addition to terminating the transmission line pairs 204-1 and 204-2, the resistor network 374 couples the input nodes 221-1, 221-2, 221-3, and 221-4 to the inputs of the combiner 310, which, for example, is a differential amplifier. In some embodiments, the resistor network 374 extracts the common-mode components from the transmission signals received via the first and second transmission line pairs 204-1 and 204-2 as first and second extracted output clock signals, respectively. The first and second extracted output clock signals, with opposite polarity, are provided to the combiner 310, which combines the extracted output clock signals into a single sampling clock signal. Alternatively, the combiner 310 extracts the common-mode components from the transmission signals as respective extracted output clock signals and combines the extracted output clock signals into a single sampling clock signal. The sampling circuits 236-1 and 236-2 are synchronized to the sampling clock signal. In some embodiments, a differential sampling circuit (e.g., 284, FIG. 2F) replaces each differential mode extraction circuit 226 and corresponding sampling circuit 236.

While the receivers 306, 366, and 372 are shown as having a single sampling circuit 236 for each transmission line pair 204, in some embodiments, the receiver includes two sampling circuits for each transmission line pair 204 to accommodate DDR signaling.

Figure 5A:
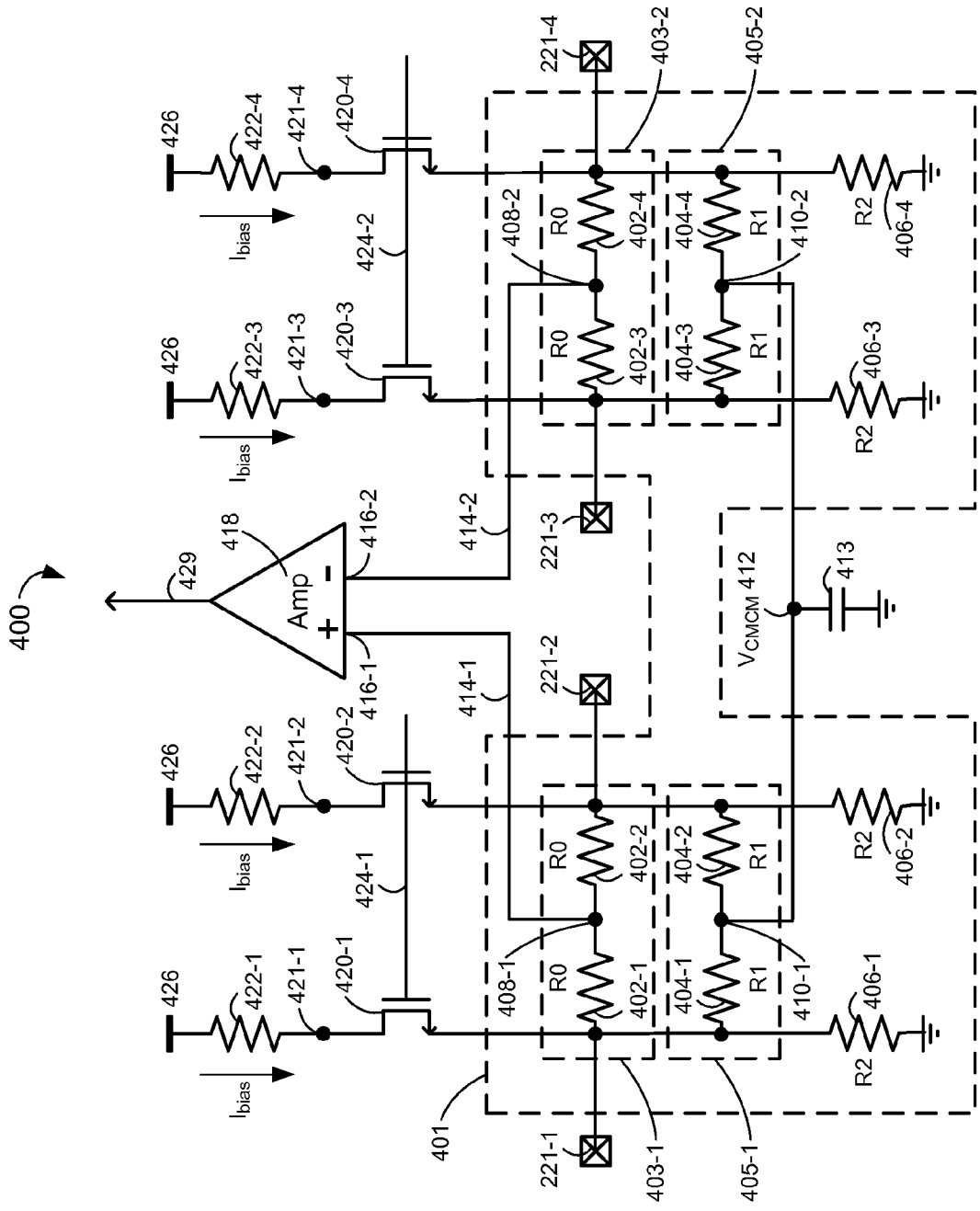
FIGS. 5A-5F illustrate circuitry for terminating transmission line pairs and providing a signal corresponding to common-mode components of signals received via the transmission line pairs, in accordance with some embodiments.

FIG. 5A illustrates circuitry 400 for terminating the transmission line pairs 204-1 and 204-2 (FIG. 4) and providing a signal corresponding to common-mode components of signals received via the first and second transmission line pairs 204-1 and 204-2, in accordance with some embodiments. For example, the circuitry 400 provides a clock signal derived from common-mode output clock signals received via the transmission line pairs 204-1 and 204-2; the common-mode output clock signals are common-mode components of the overall transmission signals received via the transmission line pairs 204-1 and 204-2. The arrangement of resistors 402, 404, and 406 in the circuitry 400 constitutes a resistor network 401 that is an example of the resistor network 374 (FIG. 4). The resistors 402-1 and 402-2 are connected in series to form a first resistive element 403-1 that is connected between the first input node 221-1 and second input node 221-2 of the interface to the first transmission line pair 204-1. Similarly, the resistors 402-3 and 402-4 are connected in series to form a second resistive element 403-2 that is connected between the first input node 221-3 and second input node 221-4 of the interface to the second transmission line pair 204-2. The resistors 404-1 and 404-2 are connected in series to form a third resistive element 405-1 that is connected between the first input node 221-1 and second input node 221-2 of the interface to the first transmission line pair 204-1, and the resistors 404-3 and 404-4 are connected in series to form a fourth resistive element 405-2 that is connected between the first input node 221-3 and second input node 221-4 of the interface to the second transmission line pair 204-2. The third and fourth resistive elements 405-1 and 405-2 also include respective intermediate nodes 410-1 and 410-2 between the corresponding resistors. The intermediate nodes 410-1 and 410-2 are connected to an AC ground $V_{CMCM}$ 412 (e.g., a virtual ground). While FIG. 5A shows both intermediate nodes 410-1 and 410-2 connected to a single bypass capacitor 413 to achieve the AC ground 412, in some embodiments each intermediate node 410-1 and 410-2 is connected to a separate bypass capacitor to achieve the AC ground 412. The resistors 406-1, 406-2, 406-3, and 406-4 each connect a respective input node 221-1, 221-2, 221-3, and 221-4 to a common DC reference level (e.g., ground).

The first resistive element 403-1 includes an intermediate node 408-1 between the resistors 402-1 and 402-2. A signal line 414-1 connects the intermediate node 408-1 to a first input 416-1 of a differential amplifier 418, thereby coupling the first input 416-1 of the amplifier 418 to the input node 221-1 via the resistor 402-1 and to the input node 221-2 via the resistor 402-2. In the example shown, the first input 416-1 of differential amplifier 418 is the non-inverting input. The differential amplifier 418 is an example of the combiner 310 (FIG. 4) in accordance with some embodiments. Similarly, the second resistive element 403-2 includes an intermediate node 408-2 between the resistors 402-3 and 402-4. A signal line 414-2 connects the intermediate node 408-2 to a second input 416-2 of the amplifier 418, thereby coupling the second input 416-2 of the amplifier 418 to the input node 221-3 via the resistor 402-3 and to the input node 221-4 via the resistor 402-4. In the example shown, the second input 416-2 of differential amplifier 418 is the inverting input. The voltage of the intermediate node 408-1 corresponds to the common-mode voltage of the first transmission line pair 204-1 and the voltage of the intermediate node 408-2 corresponds to the common-mode voltage of the second transmission line pair 204-2. The resistors 402-1 and 402-2 combine the common mode signal components of the input signals received at the input nodes 221-1 and 221-2 to generate a first common mode signal on the intermediate node 408-1. The signal line 414-1 conveys the first common mode signal to the input 416-1 of the amplifier 418. Likewise, the resistors 402-3 and 402-4 combine the common mode signal components of the input signals received at the input nodes 221-3 and 221-4 to generate a second common mode signal on the intermediate node 408-2, and the signal line 414-1 conveys the second common mode signal to the input 416-2 of the amplifier 418. The amplifier 418 subtracts one of the common mode signals from the other to generate an output signal, which is optionally amplified, on an output 429. The amplifier 418 thus provides on the output 429 a signal corresponding to the difference between the common-mode signal components of the signals received from the transmission line pairs 204-1 and 204-2. The signal on the output 429 is provided, for example, to the sampling circuits 236-1 and 236-2 (FIG. 4) as a sampling clock signal.

The circuitry 400 also includes four resistors 422-1, 422-2, 422-3, and 422-4, each connected between the drain of a respective transistor 420-1, 420-2, 420-3, or 420-4 and a voltage supply 426. The resistors 422 thus couple the transistors 420 with the voltage supply 426. The sources of the transistors 420-1 through 420-4 are connected to corresponding input nodes 221-1 through 221-4. Control lines 424-1 and 424-2 are used to turn on the transistors 420 and thus to provide a respective bias current ($I_{bias}$). In addition to providing biasing, the transistors 420 isolate the amplifiers 226 from the input nodes 221 and, in some embodiments, serve as common-gate amplifiers to amplify signals received at the input nodes 221. The signals are provided at nodes 421-1 through 421-4, each of which is connected to the drain of a respective transistor 420 and to a respective resistor 422. In some embodiments, the nodes 421-1 through 421-4 are connected to inputs of first and second differential amplifiers that provide signals corresponding to differential-mode components of signals received via the first and second transmission line pairs 204-1 and 204-2. For example, the nodes 421-1 and 421-2 are connected to inputs of the differential mode extraction circuit 226-1 (FIG. 4) and the nodes 421-3 and 421-4 are connected to inputs of the differential mode extraction circuit 226-2 (FIG. 4).

Figure 5B:
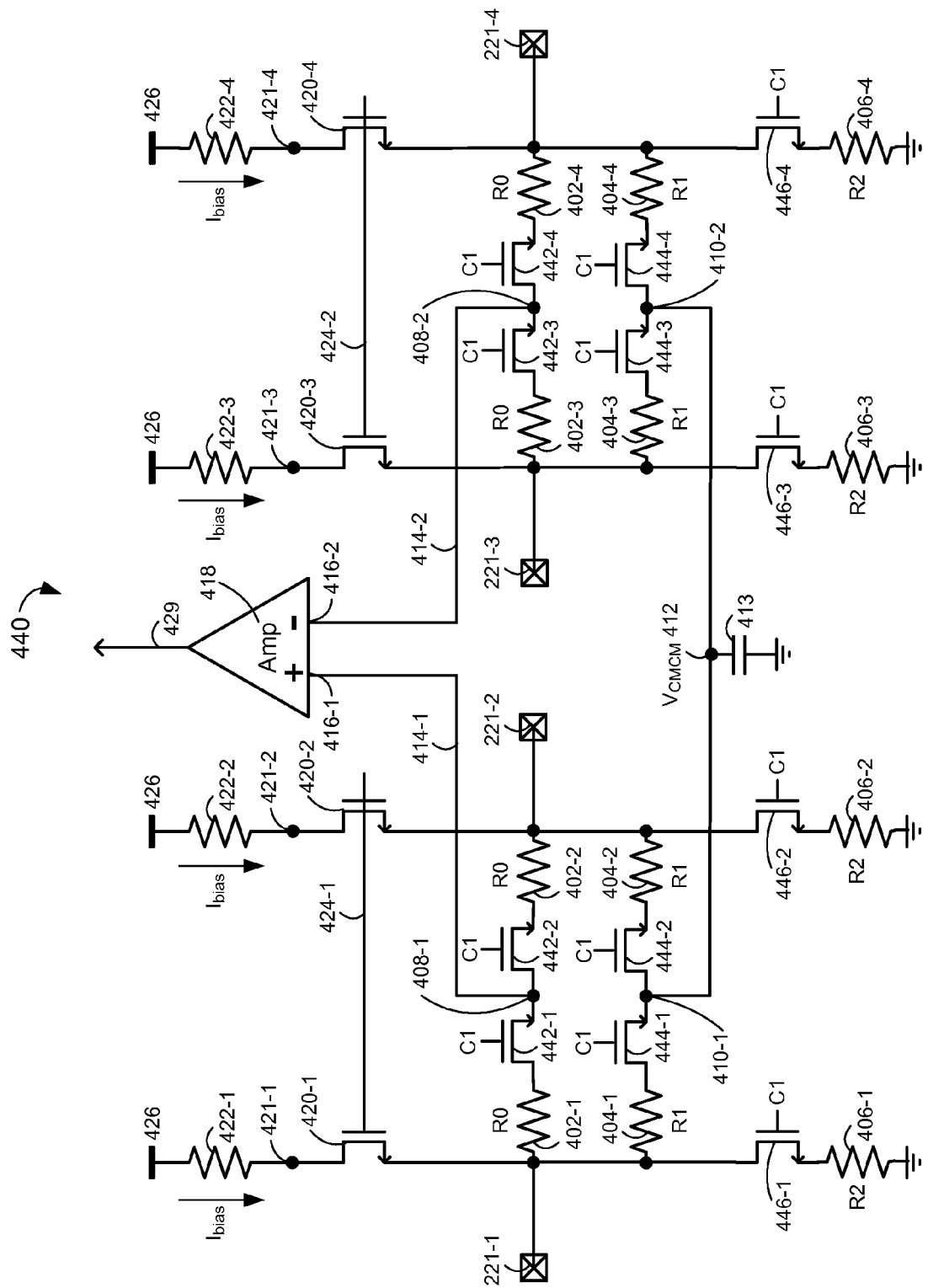

In some embodiments, the resistor network 374 (FIG. 4) includes switches to allow activation or deactivation of its termination, thus allowing bi-directional communication using the transmission line pairs 204-1 and 204-2. FIG. 5B illustrates circuitry 440 that corresponds to the circuitry 400 (FIG. 5A) and also includes switches (e.g., n-channel MOSFETs or other transistors) 442, 444, and 446 to couple or de-couple the input nodes 221 with the inputs of amplifier 418 and to activate or deactivate the termination provided by the network of resistors 402, 404, and 406, depending on whether the switches 442, 444, and 446 are closed or open. The switches 442, 444, and 446 are controlled by a control signal C1, which opens (e.g., when signal C1 is low) or closes (e.g., when signal C1 is high) the switches 442, 444, and 446.

Opening each switch 442-1 through 442-4 de-couples a respective input node 221-1 through 221-4 from the amplifier 418. Opening each switch 444-1 through 444-4 de-couples a respective input node 221-1 through 221-4 from the AC ground $V_{CMCM}$ 412. Opening each switch 446-1 through 446-4 de-couples a respective input node 221-1 through 221-4 from a respective resistor 406-1 through 406-4 and thus from the common reference level (e.g., ground). The control signal C1 (or, alternatively, a separate biasing signal (not shown)) also is provided to the gates of transistors 420-1 through 420-4 via the lines 424-1 and 424-2. The transistors 420-1 through 420-4 function as switches to isolate the inputs of the amplifiers 226 from the input nodes 221 and to couple or de-couple the resistor network to the voltage supply 426 via the resistors 422-1 through 422-4, and also as common-gate amplifiers to amplify signals received at the input nodes 221.

Figure 6A:
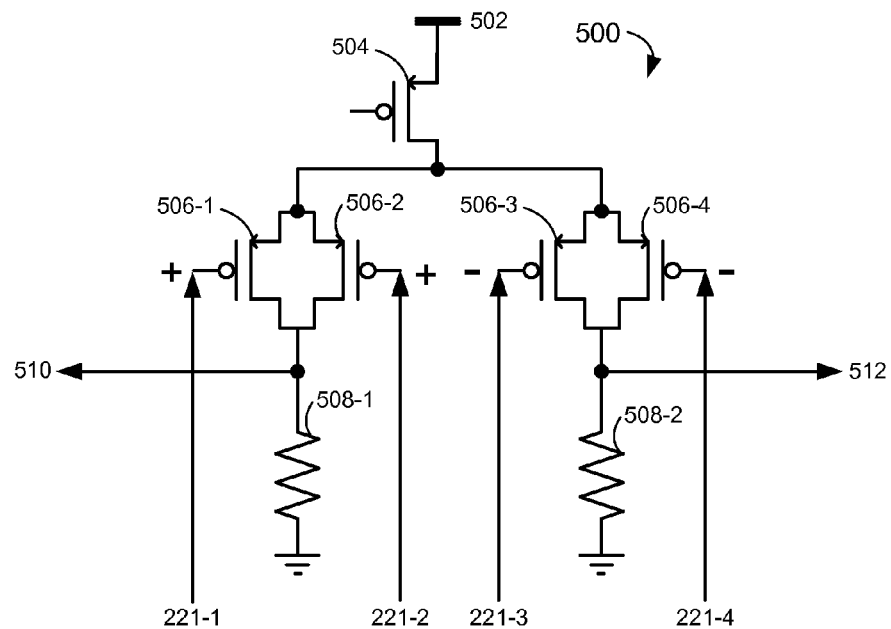
FIGS. 6A and 6B are circuit diagrams of four-input amplifiers in accordance with some embodiments.
Figure 6B:
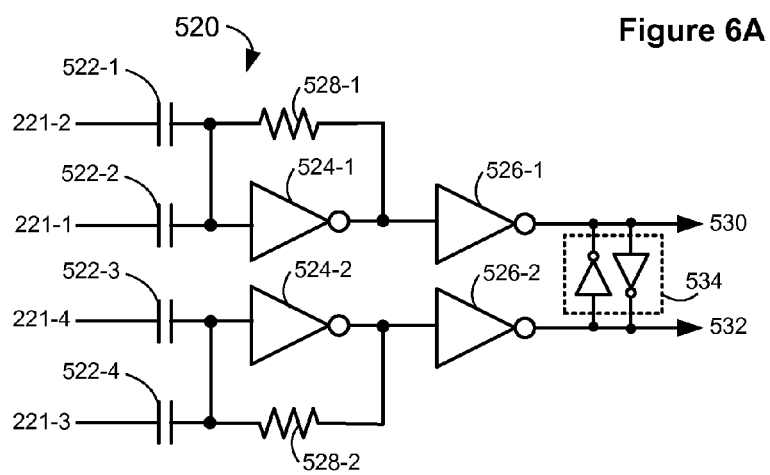
Figure 6C:
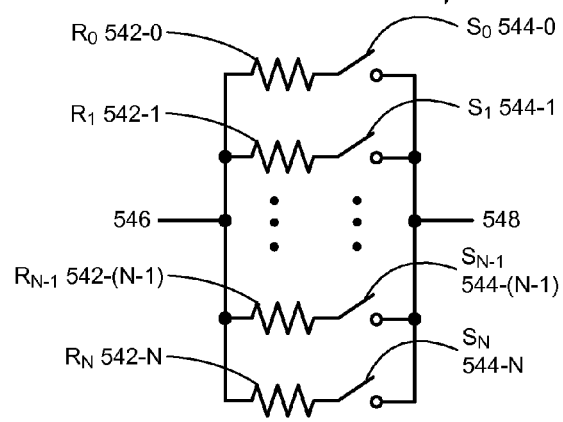
FIG. 6C is a circuit diagram of a switched variable resistor in accordance with some embodiments.

In some embodiments, a resistor and corresponding switch (e.g., resistor 402-1 and corresponding switch 442-1; resistor 404-1 and corresponding switch 444-1, resistor 406-1 and corresponding switch 446-1, etc.) are implemented together as a switched resistor (e.g., a switched variable resistor 540, FIG. 6C).

The switches 442, 444, and 446 allow for bi-directional communication using the transmission line pairs 204-1 and 204-2. For example, if the circuitry 440 were included in the receiver 372 (FIG. 4), then opening the switches 442, 444, and 446 and turning off the transistors 420 allows a transmitter (not shown) in the same device (e.g., same integrated circuit) as the receiver 372 to transmit signals via the transmission line pairs 204-1 and 204-2 to a receiver (not shown) located in a separate device (e.g., a separate integrated circuit) that includes the transmitter 302 (FIG. 4). In this example, closing the switches 442, 444, and 446 and turning on the transistors 420 allows the receiver 372 to receive signals from the transmitter 302 via the transmission line pairs 204-1 and 204-2.

The values of the resistors 402, 404, and 406 are chosen to provide the resistor network 374 with a common mode impedance and a differential mode impedance that nominally match the common mode impedance and the differential mode impedance, respectively, of the transmission line pair 204 to which the resistor network 374 is connected. Referring again to FIG. 5A, in some embodiments, the resistors 402-1 through 402-4 each have a resistance R0, the resistors 404-1 through 404-4 each have a resistance R1, and the resistors 406-1 through 406-4 each have a resistance R2. In these embodiments, the resistors of the corresponding first and second resistive elements 403-1, 403-2 thus have nominally equal resistances, the resistors of the third and fourth resistive elements 405-1, 405-2 have nominally equal resistances, and the resistors 406-1 through 406-4 have nominally equal resistances. The nominally equal resistances are equal, for example, to within manufacturing tolerances, or a specified percentage (e.g., 5% or 10%), or a specified number of significant figures. The values R0, R1, and R2 are chosen such that one-half of the resistance of the parallel combination of resistance R1 and resistance R2 is nominally equal to the common-mode impedance $R_{CM}$ of each transmission line pair 204-1 and 204-2, and twice the resistance of the parallel combination of resistance R0, resistance R1, and resistance R2 is nominally equal to the differential-mode impedance $R_{DM}$ of each transmission line pair 204-1 and 204-2, i.e.:

$$R_{CM} = \frac{R_1 R_2}{2(R_1 + R_2)} \quad (1)$$

$$R_{DM} = \frac{2R_0 R_1 R_2}{R_0 R_1 + R_0 R_2 + R_1 R_2} \quad (2)$$

In one example, $R_{DM}$=100 ohms, $R_{CM}$=32.5 ohms, the common-mode line bias $V_{(Line\ CM\ bias)}$ of each transmission line pair 204-1 and 204-2=100 mV, and $I_{bias}$=250 µA. Based on these values, R2 is derived as $V_{(Line\ CM\ bias)}/I_{bias}$=400 ohms. Using equation (1), R1 is determined to be 78 ohms. Using equation (2), R0 is then determined to be 232 ohms. In some embodiments, the values of R0, R1, and R2 are chosen such that equations (1) and (2) are satisfied within a specified tolerance. For example, R0, R1, and R2 are chosen such that equations (1) and (2) are satisfied to within 1 significant figure, or 2 significant figures, or a specified percentage (e.g., 5% or 10%), or manufacturing tolerances, or to within an amount that ensures that a system performance parameter (e.g., bit-error rate) conforms to a specified limit. In some embodiments, the calculations of R0, R1, and R2 are adjusted to account for the input impedance of the sources of the transistors 420; the input impedance can be ignored when calculating resistance values, however, if it is large compared with the values of R0, R1, and R2 as calculated in accordance with equations (1) and (2).

Selection of resistance values based on equations (1) and (2) allows proper termination of both the common mode and the differential mode while extracting common-mode signal components (e.g., common-mode clock signals), and also provides compatibility with the bias level set by a voltage-mode driver in the transmitter.

In some embodiments, one or more of the resistors 402, 404, and 406 (e.g., all of the resistors 402, 404, and 406) are adjustable to allow for calibration or configuration to meet bias, common-mode termination impedance, and differential-mode termination impedance criteria. Values of the resistors 402, 404, and 406 can be configured in accordance with equations (1) and (2) for use with various transmission line pairs 204 of differing impedances, and/or calibrated to tune the matching between the termination impedances provided by the resistor network 374 and the actual impedances of the transmission line pair 204. For example, the resistors 402, 404, and/or 406 can be implemented as switched variable resistors 540 (FIG. 6C) whose values can be adjusted to satisfy equations (1) and (2), thus allowing a single design of the resistor network 374 (FIG. 4) to be used in different systems in which transmission line pairs 204 have different values of the common-mode impedance $R_{CM}$ and differential-mode impedance $R_{DM}$.

Figure 5C:
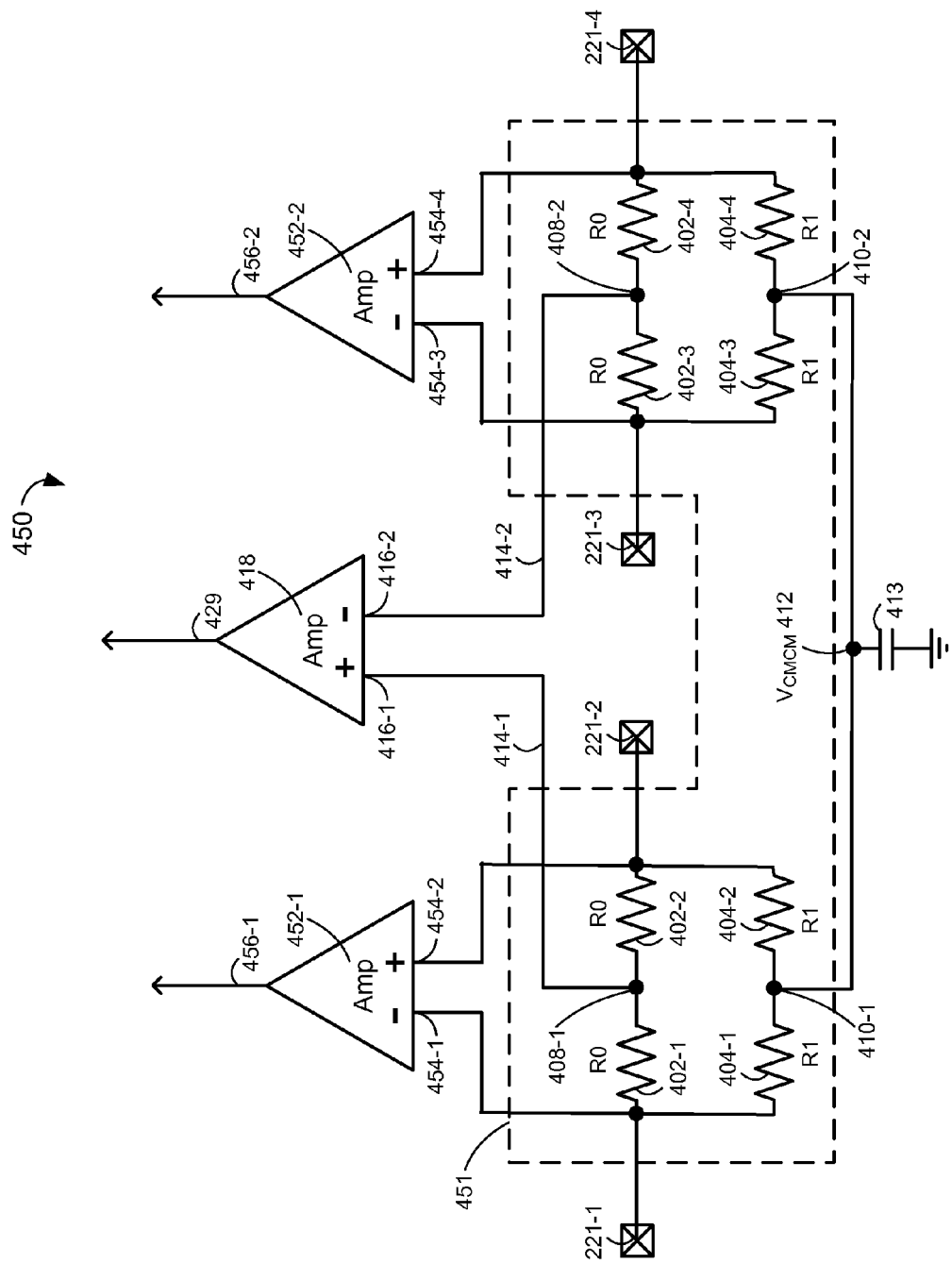

Instead of providing signals received at the input nodes 221 via the transistors 420 to differential amplifiers (e.g., 226-1 and 226-2, FIG. 4) that extract the differential-mode components, signals received at the input nodes 221 are alternatively provided directly to amplifiers to extract the differential-mode components, as shown in FIG. 5C in accordance with some embodiments. FIG. 5C illustrates circuitry 450 in which a resistor network 451 includes the resistors 402 and 404 in accordance with some embodiments. In some embodiments the resistor network 451 also includes a respective resistor (not shown) connected between each of the input nodes 221-1 through 221-4 and a common DC reference level (e.g., ground) in a manner similar to resistors 406 shown in FIG. 5A. For example, such additional resistors provide a path for DC current that flows through the input nodes 454 of the amplifiers 452. Additional resistors similar to resistors 406 are not required in the absence of DC current into the input nodes 454 of the amplifiers 452. In embodiments without resistors corresponding to resistors 406, the values R0 and R1 of the resistors 402 and 404 are determined using equations (1) and (2) with R2 assumed to be infinity (or much larger than R0 and R1); this calculation may be adjusted to account for the input impedance of the differential amplifiers 452. In addition to terminating the transmission line pairs 204-1 and 204-2, the resistor network extracts common-mode signal components of the signals received at the input nodes 221-1 through 221-4 and provides the extracted common-mode signal components to the amplifier 418 via respective intermediate nodes 408-1 and 408-2. The circuitry 450 also provides signals received at respective input nodes 221-1 through 221-4 to respective inputs 454-1 through 454-4 of two additional differential amplifiers 452-1 and 452-2. The amplifiers 452-1 and 452-2 extract the differential-mode components of the received signals and provide these differential-mode components on respective outputs 456-1 and 456-2. In the example shown, amplifiers 451-1 and 451-2 provide the differential-mode components as a single-ended signal. Alternatively, amplifiers 451-1 and 451-2 provide the differential-mode components as a differential signal. In some embodiments, the amplifiers 452-1 and 452-2 are examples of differential mode extraction circuit 226-1 and 226-2 (FIG. 4), respectively, the amplifier 418 is an example of the combiner 310 (FIG. 4), and the resistor network 451 is an example of the resistor network 374 (FIG. 4).

Figure 5D:
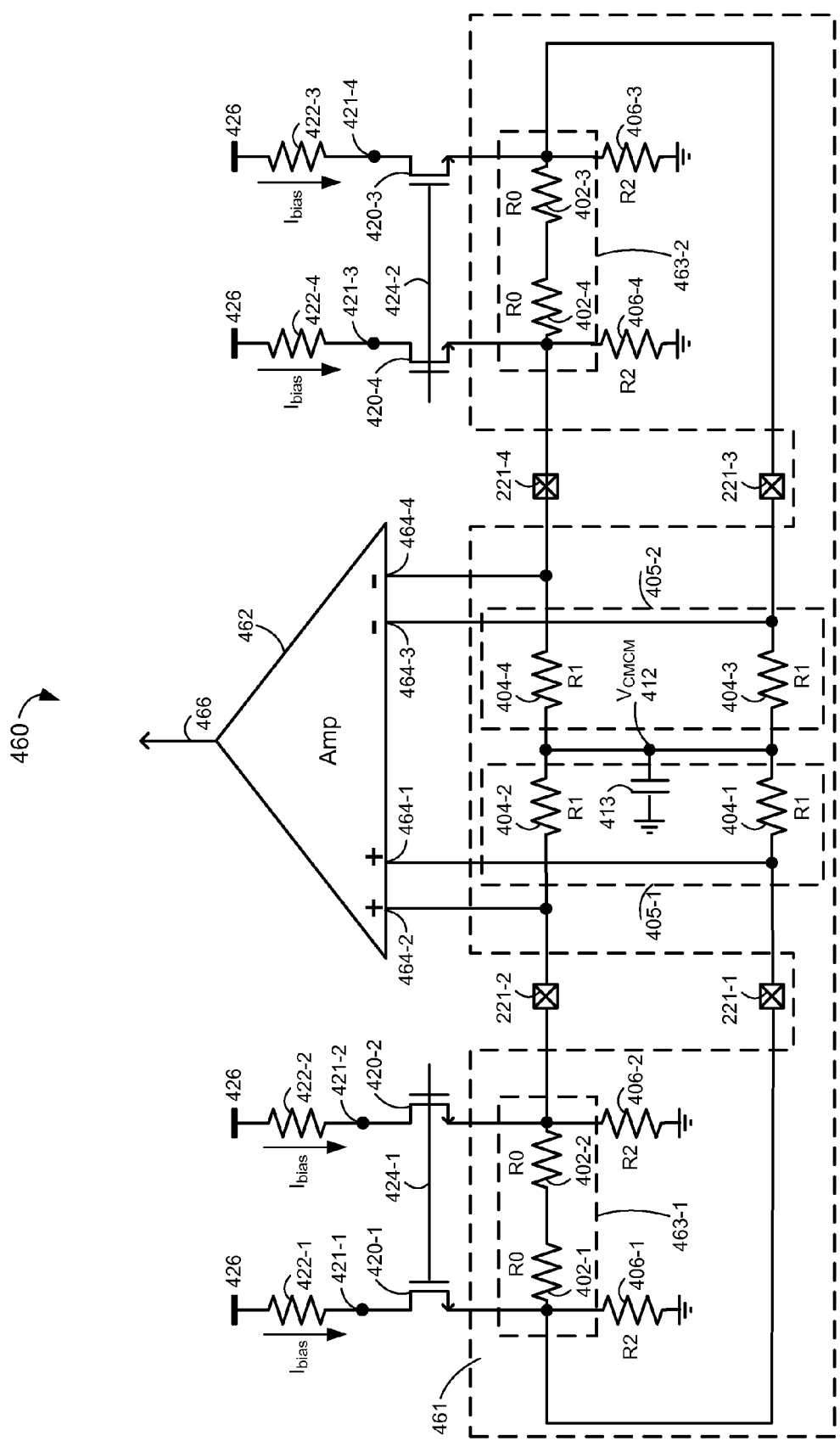

FIGS. 5A-5C illustrate examples of resistor networks that terminate both the differential and common modes of the transmission line pairs 204-1 and 204-2 with respective termination impedances and also extract the common-mode signal components from the signals received via the transmission line pairs 204-1 and 204-2. In other examples, the resistor network terminates both the differential and common modes but does not extract the common-mode signal components. For example, FIG. 5D illustrates circuitry 460 in which resistors 402, 404, and 406 constitute a resistor network 461 that, along with respective bias circuits that include respective transistors 420 and resistors 422, terminate the transmission line pairs 204-1 and 204-2 as described for the circuitry 400 (FIG. 5A). In the circuitry 460, however, the input nodes 221-1 through 221-4 are connected directly to respective inputs 464-1 through 464-4 of a four-input differential amplifier 462. In the example shown, input nodes 221-1 and 221-2 are connected to the non-inverting inputs 464-1 and 464-2 and input nodes 221-3 and 221-4 are connected to the inverting inputs 464-3 and 464-4 of the amplifier 462. Alternatively, the inverting and non-inverting inputs may be interchanged. The amplifier 462 sums the signals received at the nodes 221-1 and 221-2 to extract the common-mode component from these signals, and sums the signals received at the nodes 221-3 and 221-4 to extract the common-mode component from these signals. The amplifier 462 additionally subtracts one of the common-mode components from the other to generate a common-mode signal 466. In the example shown, amplifier 462 provides the common-mode components as a single-ended common-mode signal 466. Alternatively, amplifier 462 provides the common-mode components as a differential common-mode signal. In some embodiments, the network 461 of resistors 402, 404, and 406, as arranged in the circuitry 460, corresponds to the resistor network 374 (FIG. 4) and the amplifier 462 corresponds to the combiner 310 (FIG. 4).

In the circuitry 460, the resistors 402-1 and 402-2 form a first resistive element 463-1 connected between the first input node 221-1 and second input node 221-2 of the interface to the first transmission line pair 204-1. The resistors 402-3 and 402-4 form a second resistive element 463-2 between the first input node 221-3 and second input node 221-4 of the interface to the second transmission line pair 204-2. The resistors 404-1 and 404-2 form a third resistive element 405-1 connected between the first input node 221-1 and second input node 221-2, and the resistors 404-3 and 404-4 form a fourth resistive element 405-2 connected between the first input node 221-3 and second input node 221-4. The resistors 406, transistors 420, and resistors 422 are situated as described for the circuitry 400 (FIG. 5A).

In some embodiments, each resistor 402 has a resistance R0, each resistor 404 has a resistance R1, and each resistor 406 has a resistance R2. The values R0, R1, and R2 are chosen in accordance with equations (1) and (2) described above, and may be adjusted to account for the source input impedance of the transistors 420 and the input impedance of the amplifier 462. The first and second resistive elements 463-1 and 463-2 thus each have a resistance of 2*R0. In some embodiments, a single resistor with a resistance of 2*R0 is used as resistive element 463-1. Similarly, a single resistor with a resistance of 2*R0 is used as resistive element 463-2.

Figure 5E:
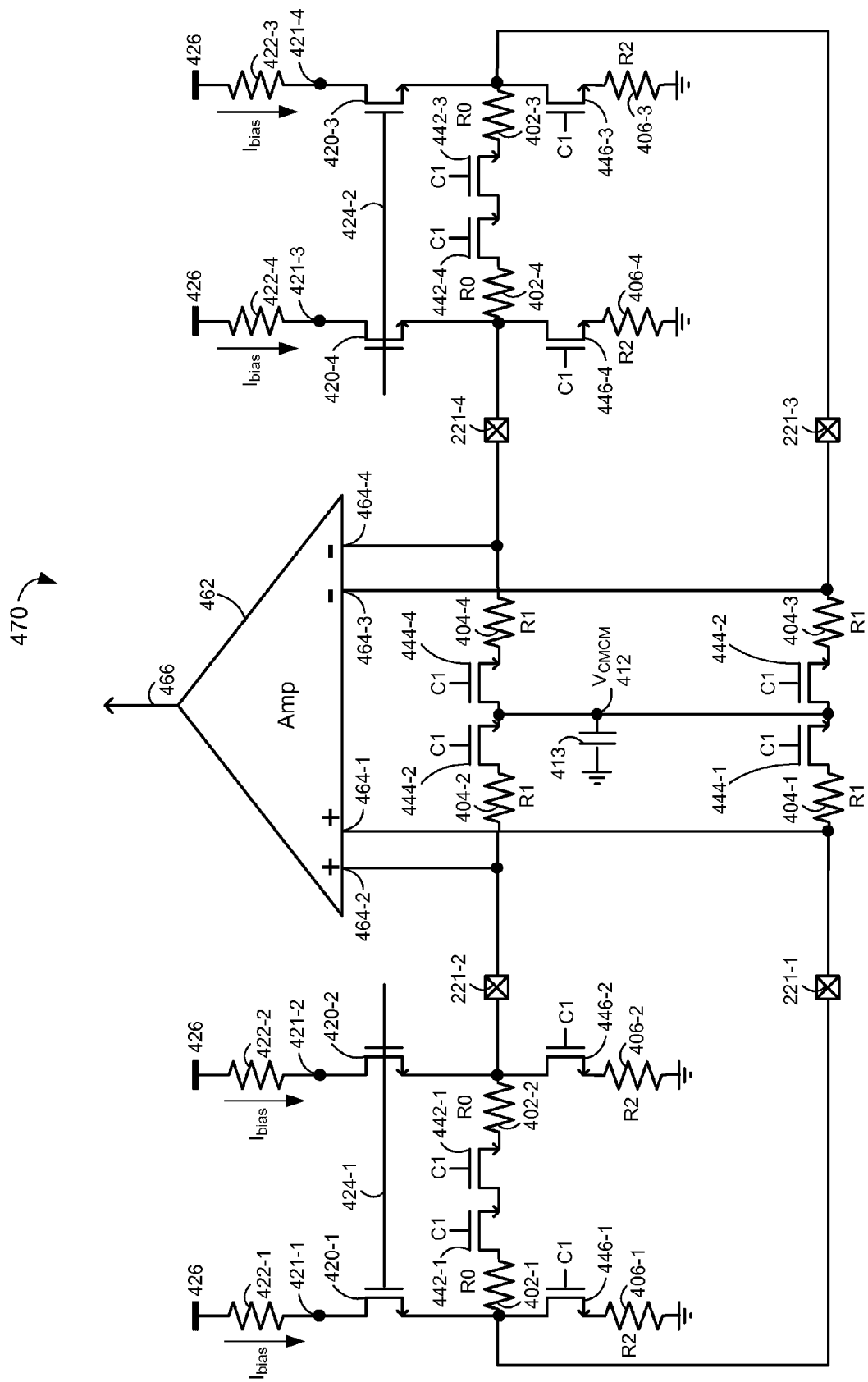

FIG. 5E illustrates circuitry 470 that corresponds to the circuitry 460 (FIG. 5D) and also includes switches (e.g., n-channel MOSFETs or other transistors) 442, 444, and 446 to activate or deactivate the termination provided by the network of resistors 402, 404, and 406. The switches 442, 444, and 446 are controlled by control signal C1, as described above with reference to the circuitry 440 (FIG. 5B). The circuitry 470, like the circuitry 440, allows for bi-directional communication using the transmission line pairs 204-1 and 204-2.

Figure 5F:
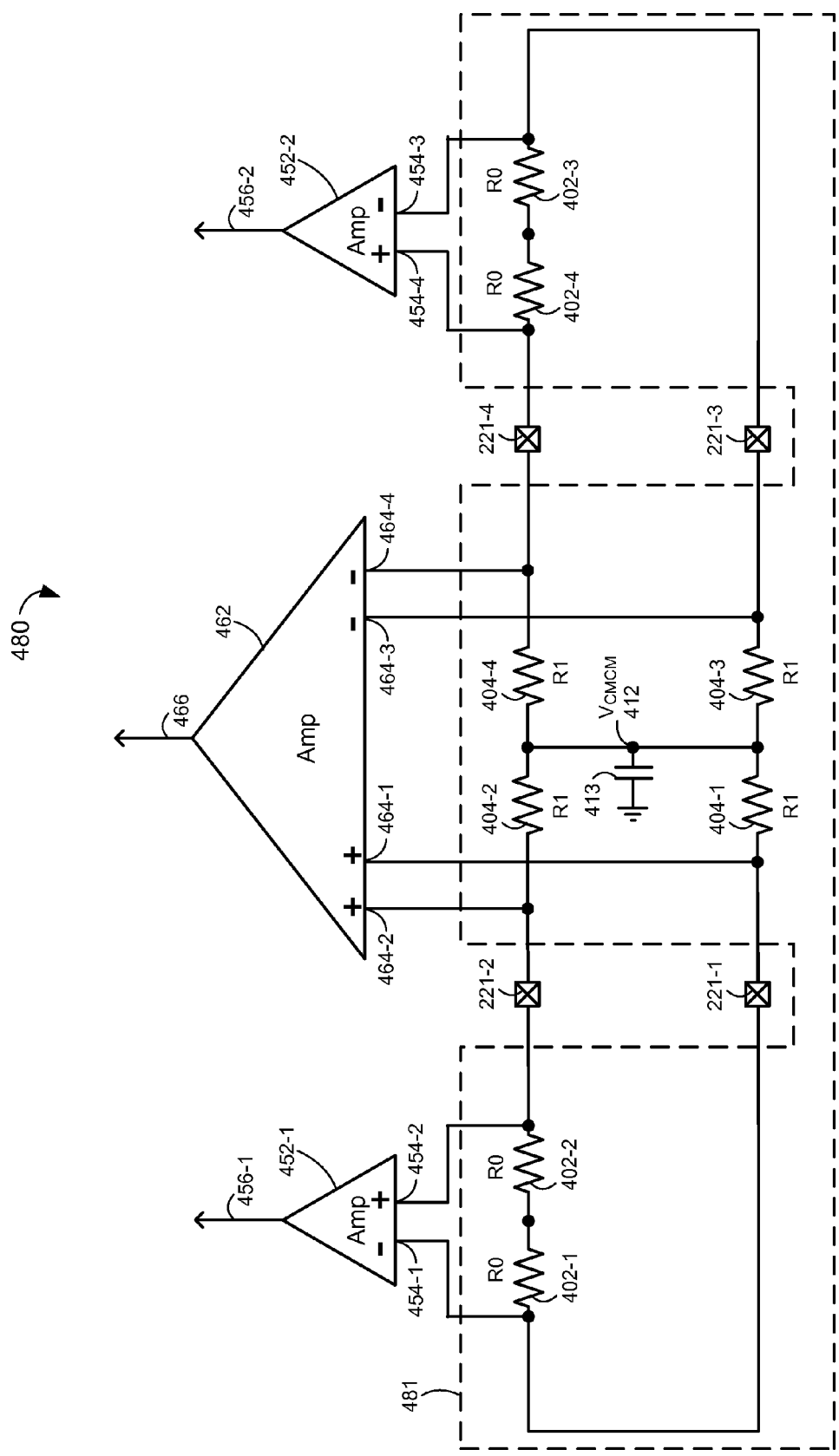

FIG. 5F illustrates circuitry 480 in which a resistor network 481 that includes the resistors 402 and 404 terminates the transmission line pairs 204-1 and 204-2, in accordance with some embodiments. In some embodiments, the resistor network 481 also includes a respective resistor (not shown) connected between each of the input nodes 221-1 through 221-4 to a common DC reference level (e.g., ground) in a manner similar to resistors 406 shown in FIG. 5D. In embodiments without resistors corresponding to resistors 406, the values R0 and R1 of the resistors 402 and 404 are determined using equations (1) and (2) with R2 assumed to be infinity, and may be adjusted to account for the input impedance of the amplifiers 462 and 452. The circuitry 480 includes the amplifier 462, which functions as described for the circuitry 460 (FIG. 5D). The circuitry 480 also provides signals received at respective input nodes 221-1 through 221-4 to respective inputs 454-1 through 454-4 of the differential amplifiers 452-1 and 452-2; the amplifiers 452-1 and 452-2 function as described above with reference to the circuitry 450 (FIG. 5C). In some embodiments, the amplifiers 452-1 and 452-2 are examples of differential mode extraction circuit 226-1 and 226-2 (FIG. 4), the amplifier 462 is an example of the combiner 310 (FIG. 4), and the resistor network 481 is an example of the resistor network 374 (FIG. 4).

Systems that use a four-input differential amplifier (e.g., amplifier 462, FIGS. 5D-5F) to extract the common-mode signal components offer potentially higher bandwidth and gain, and simpler circuit routing, than systems in which common-mode signal components are extracted at intermediate nodes 408-1 and 408-2 using pairs of resistors 402-1/402-2 and 402-3/402-4 (e.g., in the circuitry 400, 440, or 450, FIGS. 5A-5C) and then provided to a two-input differential amplifier (e.g., amplifier 418, FIGS. 5A-5C). In some embodiments, using a 4-input amplifier will involve the use of multiple offset correction ports in addition to the direct input ports to cancel any offset that is present due to manufacturing irregularities.

FIG. 6A is a circuit diagram of an example 500 of a four-input differential amplifier that can be used as the amplifier 462 (FIGS. 5D-5F) in accordance with some embodiments. The amplifier 500 is a current-mode logic (CML) PMOS amplifier with a first differential pair of PMOS transistors 506-1 and 506-2 and a second differential pair of PMOS transistors 506-3 and 506-4. Alternatively, the amplifier 500 includes first and second differential pairs of NMOS transistors. The gates of the four transistors 506 are connected to the four inputs of the amplifier 500. Specifically, the gates of the transistors 506-1 and 506-2 in the first differential pair are connected to the first and second input nodes 221-1 and 221-2 connected to the first transmission line pair 204-1. Likewise, the gates of the transistors 506-3 and 506-4 in the second differential pair are connected to the first and second input nodes 221-3 and 221-4 connected to the second transmission line pair 204-2. In some embodiments, the amplifier 500 includes one or more additional pairs of transistors (not shown) to provide offset correction by reducing or eliminating residual offset for the common-mode components extracted by the first pair of transistors 506-1, 506-2 as opposed to the common-mode components extracted by the second pair of transistors 506-3, 506-4. Reducing or eliminating this residual offset improves or optimizes gain and/or resolution in extraction of the common-mode clock.

Resistor 508-1 is a common drain load for transistors 506-1 and 506-2. Resistor 508-2 is a common drain load for transistors 506-3 and 506-4. A transistor 504 connected between voltage supply 502 and the sources of the transistors 506-1 through 506-4 provides a bias current in response to a bias voltage applied to its gate. The bias current is shared among transistors 506-1 through 506-4 in accordance with their respective gate voltages. In some embodiments, a respective source-degrading resistor is connected in series with the source of each of the transistors 506-1 through 506-4 to improve linearity of the amplifier 500. A signal line 510 connected to the drains of the transistors 506-1 and 506-2 provides a first output and a signal line 512 connected to the drains of the transistors 506-3 and 506-4 provides a second output. Together, the signal lines 510 and 512 provide a differential output signal as the common mode signal 466 (FIGS. 5D-5F). In an example in which the common-mode components of the signals received via the transmission line pairs 204-1 and 204-2 are clock signals of opposite polarity, the amplifier 500 outputs a differential clock signal on the signal lines 510 and 512.

FIG. 6B is a circuit diagram of another example 520 of a four-input differential amplifier that can be used as the amplifier 462 (FIGS. 5D-5F) in accordance with some embodiments. The amplifier 520 is a self-biased inverter amplifier. A first pair of inverters 524-1 and 526-1 is arranged in series, with the input of the inverter 524-1 AC-coupled via capacitors 522-1 and 522-2 to the first and second input nodes 221-1 and 221-2 connected to the first transmission line pair 204-1. Likewise, a second pair of inverters 524-2 and 526-2 is arranged in series, with the input of the inverter 524-2 AC-coupled via capacitors 522-3 and 522-4 to the first and second input nodes 221-3 and 221-4 connected to the second transmission line pair 204-2. Resistors 528-1 and 528-2 respectively couple the inputs of the inverters 524-1 and 524-2 to the outputs of the inverters 524-1 and 524-2. In some embodiments, the resistors 528 and capacitors 522 have values selected to provide an RC product greater than the reciprocal of the clock frequency. In some embodiments, the resistors 528 are implemented using transistors (e.g., transistors operating in the linear region). The outputs 530 and 532 of the inverters 526-1 and 526-2 are cross-coupled by a pair of oppositely oriented inverters 534. In some embodiments, the inverters 526-1 and 526-2 and/or the inverters 534 are omitted from the amplifier 520. However, inclusion of the inverters 526-1, 526-2, and 534 improves the output swing of the amplifier 520 by increasing the voltage separation between the outputs 530 and 532. Together, the outputs 530 and 532 correspond to the output 466 (FIGS. 5D-5F). In an example in which the common-mode components of the signals received via the transmission line pairs 204-1 and 204-2 are clock signals of opposite polarity, amplifier 520 outputs a differential clock signal at the outputs 530 and 532.

In some embodiments, resistors in a resistor network 374 (FIG. 4) are both switchable, to allow for bi-directional communication as discussed with regard to FIG. 5B, and adjustable, to allow the values of the resistors to be configured in accordance with equations (1) and (2) for use with various transmission line pairs 204 of differing impedances, and/or calibrated to tune the matching between the termination impedances provided by the resistor network 374 and the actual impedances of the transmission line pair 204. FIG. 6C is a circuit diagram of an example 540 of a switched variable resistor that can be used to implement any and/or all of the resistors in FIGS. 5A-5F (e.g., the resistors 402, 404, and/or 406) in accordance with some embodiments. The switched variable resistor 540 includes N resistor-switch pairs, each composed of a resistor 542 and a switch 544, situated between a first terminal 546 and a second terminal 548, where N is an integer greater than 1. Each resistor 542 is in series with its corresponding switch 544 (i.e., resistor 542-0 is in series with switch 544-0, resistor 542-1 is in series with switch 544-1, etc.). The resistor-switch pairs are all arranged in parallel (i.e., the pair 542-0 and 544-0 is in parallel with the pair 542-1 and 544-1 and in parallel with the pair 542-N and 544-N, etc.). The resistance between terminals 546 and 548 of the switched variable resistor 540 can be adjusted by opening or closing various switches 544. The resistance of the switched variable resistor 540 can be made large by opening every switch 544, which in some embodiments is equivalent to opening a switch 442, 444, or 446 (FIGS. 5B, 5E) corresponding to a resistor 402, 404, or 406. Respective switches 544 are opened or closed depending on the respective values of corresponding bits, sometimes referred to as digital trim bits, which are stored, for example, in a register coupled to the switched variable resistor 540. In some embodiments, the resistors 542 differ in resistance. In one example, the resistors 542 have binary weighted resistances: 1R, 2R, 4R, etc.)

Attention is now directed to a method of receiving data.

Figure 7:
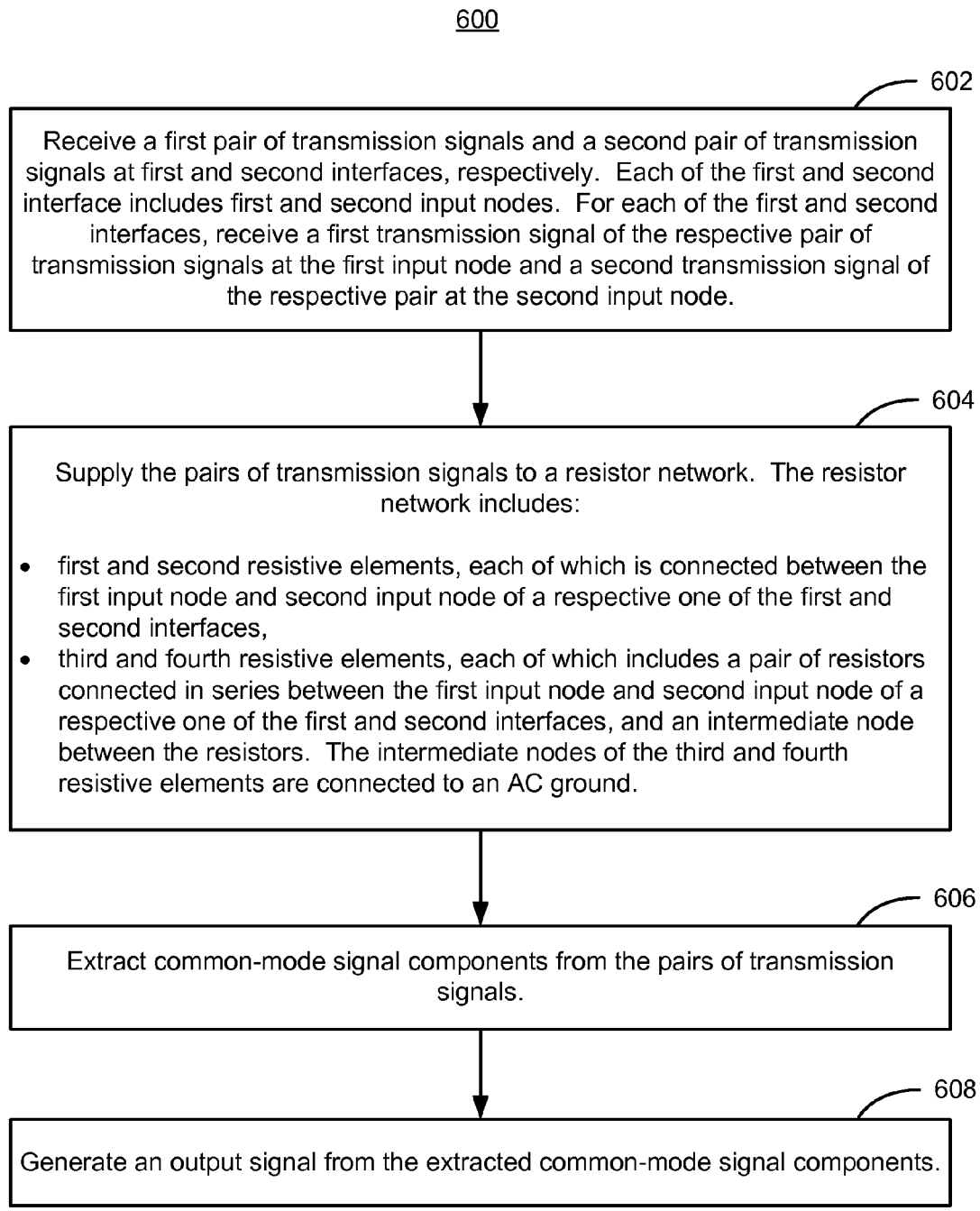
FIG. 7 is a flow diagram illustrating a method of receiving signals from first and second pairs of transmission lines in accordance with some embodiments.

FIG. 7 is a flow diagram illustrating a method 600 of receiving signals from first and second pairs of transmission lines (e.g., pairs 204-1 and 204-2) in accordance with some embodiments. While the method 600 described below includes operations that appear to occur in a specific order, it should be apparent that the method 600 can include more or fewer operations, that two or more of the operations can be performed in parallel, and that two or more operations can be combined into a single operation.

In some embodiments, the method 600 is performed in the receiver 372 (FIG. 4). For example, the method 600 is performed using the circuitry 400, 440, 450, 460, 470, or 480 (FIGS. 5A-5F).

A first pair of transmission signals and a second pair of transmission signals are received (602) at first and second interfaces, respectively. Each of the interfaces includes first and second input nodes. For each of the first and second interfaces, a first transmission signal of the respective pair of transmission signals is received at the first input node and a second transmission signal of the respective pair of transmission signals is received at the second input node. For example, the first pair of transmission signals is received via the first transmission line pair 204-1. The first transmission signal of the first pair of transmission signals is received at the first input node 221-1 and the second transmission signal of the first pair of transmission signals is received at the second input node 221-2. Also in this example, the second pair of transmission signals is received via the second transmission line pair 204-2. The first transmission signal of the second pair of transmission signals is received at the first input node 221-3 and the second transmission signal of the second pair of transmission signals is received at the second input node 221-4.

The pairs of transmission signals are supplied (604) to a resistor network (e.g., resistor network 374, FIG. 4). The resistor network includes first and second resistive elements, each of which is connected between the first input node and second input node of a respective one of the first and second interfaces. For example, the resistors 402-1 and 402-2 (FIGS. 5A-5F) constitute a first resistive element 403-1 (FIG. 5A) or 463-1 (FIG. 5D) between the input nodes 221-1 and 221-2, and the resistors 402-3 and 402-4 (FIGS. 5A-5F) constitute a second resistive element 403-2 (FIG. 5A) or 463-2 (FIG. 5D) between the input nodes 221-3 and 221-4. The resistor network also includes third and fourth resistive elements, each of which includes (1) a pair of resistors connected in series between the first input node and second input node of a respective one of the first and second interfaces, and (2) an intermediate node between the resistors. For example, the resistors 404-1 and 404-2 and intermediate node 410-1 constitute a third resistive element 405-1 (FIGS. 5A, 5D), and the resistors 404-3 and 404-4 and intermediate node 410-2 constitute a fourth resistive element 405-2 (FIGS. 5A, 5D). The intermediate nodes of the third and fourth resistive elements are connected to an AC ground (e.g., $V_{CMCM}$ 412, FIGS. 5A-5F).

Common-mode signal components are extracted (606) from the pairs of transmission signals. For example, the common-mode signal components are extracted at the intermediate nodes 408-1 and 408-2 (FIGS. 5A-5C) or by the amplifier 462 (FIGS. 5D-5F).

An output signal derived from the extracted common-mode signal components is generated (608). For example, the output signal is provided on the output 429 of the amplifier 418 (FIGS. 5A-5C) or on the output 466 of the amplifier 462 (FIGS. 5D-5F). In some embodiments, the output signal is a clock signal provided to sampling circuits (e.g., 236-1 and 236-2, FIG. 4) or to a timing circuit that in turn provides a sampling clock to sampling circuits.

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable the inventions and various embodiments to be implemented with various modifications as are suited to the particular use contemplated.

What is claimed is:

1. A receiver circuit to receive signals from first and second pairs of transmission lines external to the receiver circuit, wherein the first pair of transmission lines and the second pair of transmission lines each have a common-mode impedance and a differential-mode impedance, the receiver circuit comprising:
    first and second interfaces, each comprising a first input node and a second input node, the first and second input nodes of a respective interface to receive respective ones of the signals from respective ones of the transmission lines;
    a resistor network comprising:
        first and second resistive elements, each connected between the first input node and the second input node of a respective one of the first and second interfaces, wherein the first and second respective resistive elements each have a resistance 2*R0; and
        third and fourth resistive elements, each comprising:
            a respective pair of resistors connected in series between the first input node and second input node of a respective one of the first and second interfaces, and
            an intermediate node between the resistors, the intermediate node connected to an AC ground;
        wherein each resistor of the third and fourth respective resistive elements has a resistance R1;
    a differential amplifier comprising a first input coupled to the first interface, a second input coupled to the second interface, and an output to provide a signal derived from common mode components of the signals received at the first and second input nodes of the first and second interfaces; and
    four resistors, each connecting a respective input node of the first and second interfaces to a common reference level, wherein the four resistors each have a resistance R2;
    wherein:
        the resistances R1 and R2 have values such that a parallel combination of resistance R1 and resistance R2 is nominally equal to twice the common-mode impedance of the first and second respective pairs of transmission lines; and
        the resistances R0, R1, and R2 have values such that a parallel combination of resistance R0, resistance R1, and resistance R2 is nominally equal to one-half the differential-mode impedance of the first and second respective pairs of transmission lines.

2. The receiver circuit of claim 1, wherein the resistors of the third and fourth resistive elements are nominally equal in resistance.

3. The receiver circuit of claim 1, wherein:
    the first and second resistive elements each comprise a pair of resistors connected in series, wherein each of the resistors of the first and second resistive elements has a resistance R0.

4. The receiver circuit of claim 1, additionally comprising switches to decouple respective ones of the first and second input nodes of the first and second interfaces from the amplifier.

5. The receiver circuit of claim 1, additionally comprising a bypass capacitor connected to the intermediate nodes of the third and fourth resistive elements to provide the AC ground.

6. The receiver circuit of claim 1, additionally comprising a first bypass capacitor connected to the intermediate node of the third resistive element and a second bypass capacitor connected to the intermediate node of the fourth resistive element, the first and second capacitors to provide the AC ground.

7. The receiver circuit of claim 1, wherein:
the first and second resistive elements each comprise a pair of resistors connected in series and an intermediate node between the resistors;
the first input of the differential amplifier is connected to the intermediate node of the first resistive element; and
the second input of the differential amplifier is connected to the intermediate node of the second resistive element.

8. The receiver circuit of claim 1, wherein:
the differential amplifier additionally comprises a third input and a fourth input;
the first input of the differential amplifier is connected to the first input node of the first interface;
the second input of the differential amplifier is connected to the first input node of the second interface;
the third input of the differential amplifier is connected to the second input node of the first interface; and
the fourth input of the differential amplifier is connected to the second input node of the second interface.

9. The receiver circuit of claim 8, wherein:
the differential amplifier comprises a first differential pair of transistors and a second differential pair of transistors, the transistors each comprising a gate; and
the first and second input nodes of the first interface are connected to the gates of the first differential pair of transistors, and the first and second input nodes of the second interface are connected to the gates of the second differential pair of transistors.

10. The receiver circuit of claim 9, wherein the differential amplifier additionally comprises a first resistor to couple the first differential pair to a common reference level and a second resistor to couple the second differential pair to the common reference level.

11. The receiver circuit of claim 1, wherein at least one of the first, second, third, and fourth resistive elements is adjustable.

12. The receiver circuit of claim 1, wherein the differential amplifier is a first differential amplifier, the receiver circuit further comprising:
a second differential amplifier to provide a signal corresponding to differential mode components of the signals received at the first and second input nodes of the first interface; and
a third differential amplifier to provide a signal corresponding to differential mode components of the signals received at the first and second input nodes of the second interface.

13. The receiver circuit of claim 12, wherein:
the second differential amplifier comprises a first input connected directly to the first input node of the first interface and a second input connected directly to the second input node of the first interface; and
the third differential amplifier comprises a first input connected directly to the first input node of the second interface and a second input connected directly to the second input node of the second interface.

14. A receiver circuit to receive signals from first and second pairs of transmission lines external to the receiver circuit, the receiver circuit comprising:
first and second interfaces, each comprising a first input node and a second input node, the first and second input nodes of a respective interface to receive respective ones of the signals from respective ones of the transmission lines;
a resistor network comprising:
first and second resistive elements, each connected between the first input node and the second input node of a respective one of the first and second interfaces; and
third and fourth resistive elements, each comprising:
a respective pair of resistors connected in series between the first input node and second input node of a respective one of the first and second interfaces, and
an intermediate node between the resistors, the intermediate node connected to an AC ground; and
a differential amplifier comprising a first input connected to the first input node of the first interface, a second input connected to the first input node of the second interface, a third input of the amplifier connected to the second input node of the first interface, a fourth input of the amplifier connected to the second input node of the second interface, and an output to provide a signal derived from common mode components of the signals received at the first and second input nodes of the first and second interfaces;
wherein the differential amplifier comprises a first pair of inverters arranged in series and AC-coupled to the first and second input nodes of the first interface, and a second pair of inverters arranged in series and AC-coupled to the first and second input nodes of the second interface.

15. The receiver circuit of claim 14, additionally comprising four resistors, each connecting a respective input node of the first and second interfaces to a common reference level.

16. The receiver circuit of claim 15, wherein the four resistors are nominally equal in resistance.

17. The receiver circuit of claim 15, additionally comprising switches to disconnect respective ones of the first and second input nodes of the first and second interfaces from the common reference level.

18. The receiver circuit of claim 14, wherein
the first and second resistive elements each comprise a pair of resistors connected in series and an intermediate node between the resistors;
the first input of the differential amplifier is connected to the intermediate node of the first resistive element; and
the second input of the differential amplifier is connected to the intermediate node of the second resistive element.

19. The receiver circuit of claim 14, additionally comprising switches to decouple respective ones of the first and second input nodes of the first and second interfaces from the amplifier.

20. The receiver circuit of claim 14, wherein:
the differential amplifier additionally comprises a third input and a fourth input;
the first input of the differential amplifier is connected to the first input node of the first interface;
the second input of the differential amplifier is connected to the first input node of the second interface;
the third input of the differential amplifier is connected to the second input node of the first interface; and
the fourth input of the differential amplifier is connected to the second input node of the second interface.

21. The receiver circuit of claim 20, wherein:
the differential amplifier comprises a first differential pair of transistors and a second differential pair of transistors, the transistors each comprising a gate; and
the first and second input nodes of the first interface are connected to the gates of the first differential pair of transistors, and the first and second input nodes of the second interface are connected to the gates of the second differential pair of transistors.

22. A receiver circuit to receive signals from first and second pairs of transmission lines external to the receiver circuit, the receiver circuit comprising:
first and second interfaces, each comprising a first input node and a second input node, the first and second input nodes of a respective interface to receive respective ones of the signals from respective ones of the transmission lines;
a resistor network comprising:
  first and second resistive elements, each connected between the first input node and the second input node of a respective one of the first and second interfaces; and
  third and fourth resistive elements, each comprising:
    a respective pair of resistors connected in series between the first input node and second input node of a respective one of the first and second interfaces, and
    an intermediate node between the resistors, the intermediate node connected to an AC ground;
a first differential amplifier comprising a first input coupled to the first interface, a second input coupled to the second interface, and an output to provide a signal derived from common mode components of the signals received at the first and second input nodes of the first and second interfaces;
a second differential amplifier to provide a signal corresponding to differential mode components of the signals received at the first and second input nodes of the first interface;
a third differential amplifier to provide a signal corresponding to differential mode components of the signals received at the first and second input nodes of the second interface; and
four transistors, each comprising a source and a drain, each source directly connected to a respective input node of the first and second input nodes of the first and second interfaces, each drain coupled to a voltage supply; wherein:
  the second differential amplifier comprises first and second inputs connected directly to respective drains of first and second transistors of the four transistors, wherein the sources of the first and second transistors are respectively connected directly to the first and second input nodes of the first interface; and
  the third differential amplifier comprises first and second inputs connected directly to respective drains of third and fourth transistors of the four transistors, wherein the sources of the third and fourth transistors are respectively connected directly to the first and second input nodes of the second interface.

23. The receiver circuit of claim 22, additionally comprising four resistors, each connecting a respective input node of the first and second interfaces to a common reference level.

24. The receiver circuit of claim 23, additionally comprising switches to disconnect respective ones of the first and second input nodes of the first and second interfaces from the common reference level.

25. The receiver circuit of claim 22, additionally comprising switches to decouple respective ones of the first and second input nodes of the first and second interfaces from the amplifier.

26. The receiver circuit of claim 22, wherein:
the differential amplifier additionally comprises a third input and a fourth input;
the first input of the differential amplifier is connected to the first input node of the first interface;
the second input of the differential amplifier is connected to the first input node of the second interface;
the third input of the differential amplifier is connected to the second input node of the first interface; and
the fourth input of the differential amplifier is connected to the second input node of the second interface.

27. The receiver circuit of claim 26, wherein:
the differential amplifier comprises a first differential pair of transistors and a second differential pair of transistors, the transistors each comprising a gate; and
the first and second input nodes of the first interface are connected to the gates of the first differential pair of transistors, and the first and second input nodes of the second interface are connected to the gates of the second differential pair of transistors.

* * * * *